(12) United States Patent
Chawla et al.

(10) Patent No.: US 11,593,279 B2
(45) Date of Patent: *Feb. 28, 2023

(54) GRAPH-BASED DATA FLOW CONTROL SYSTEM

(71) Applicant: Dell Products L.P., Round Rock, TX (US)

(72) Inventors: Gaurav Chawla, Austin, TX (US); Mark Steven Sanders, Roanoke, VA (US); Elie Jreij, Pflugerville, TX (US); Jimmy D. Pike, Georgetown, TX (US); Robert W. Hormuth, Cedar Park, TX (US); William Price Dawkins, Lakeway, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,247

(22) Filed: Jun. 14, 2022

(65) Prior Publication Data
US 2022/0327066 A1    Oct. 13, 2022

Related U.S. Application Data

(63) Continuation of application No. 17/071,036, filed on Oct. 15, 2020, now Pat. No. 11,392,513.

(51) Int. Cl.
*G06F 13/12* (2006.01)
*G06F 16/901* (2019.01)

(52) U.S. Cl.
CPC ........ *G06F 13/124* (2013.01); *G06F 16/9024* (2019.01)

(58) Field of Classification Search
CPC ........................... G06F 13/124; G06F 16/9024
See application file for complete search history.

(56) References Cited

U.S. PATENT DOCUMENTS 11,392,513 B2 * 7/2022 Chawla ................. G06F 13/124

* cited by examiner

*Primary Examiner* — Zachary K Huson
(74) *Attorney, Agent, or Firm* — Joseph Mencher

(57) ABSTRACT

A graph-based data flow control system includes a control plane system coupled to SCP subsystems. The control plane system identifies a workload, and identifies service(s) on the SCP subsystems for manipulating/exchanging data to perform the workload. The control plane system generates a respective SCP-local data flow control graph for each SCP subsystem that defines how their service(s) will manipulate/exchange data within that SCP subsystem, and generates inter-SCP data flow control graph(s) that define how service(s) provided by at least one SCP subsystem will manipulate/exchange data with service(s) provided by at least one other SCP subsystem. The control plane system then transmits each respective SCP-local data flow control graph to each of the SCP subsystems, and the inter-SCP data flow control graph(s) to at least one SCP subsystem, for use by the SCP subsystems in causing their service(s) to manipulate/exchange data to perform the workload.

20 Claims, 15 Drawing Sheets

GRAPH-BASED DATA FLOW CONTROL SYSTEM

CROSS-REFERENCE TO RELATED APPLICATIONS

The present disclosure is a continuation of U.S. patent application Ser. No. 17/071,036, filed on Oct. 15, 2020, the disclosure of which is incorporated by reference herein in its entirety.

BACKGROUND

The present disclosure relates generally to information handling systems, and more particularly to controlling data flows through information handling systems using data flow control graphs.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices and/or other computing systems known in the art may be configured to receive data, manipulate that data, and/or exchange that data with each other. The inventors of the present disclosure have developed a System Control Processor (SCP) subsystem that may be provided in server devices to perform a variety of services (e.g., infrastructure services, trusted applications, and/or other SCP operations), and those SCP subsystems may be deployed along with their server devices across network edge locations, network core locations, and network cloud locations, as well as across datacenters. For example, for 5G wireless/edge solutions, SCP subsystems may be provided at the "far" network edge locations (e.g., to perform virtual Radio Access Network (vRAN) services, private Long Term Evolution (LTE)/Citizen Band Radio Service (CBRS) services, etc.), at the network edge (e.g., to perform Telephone company (Telco) services), at the near network edge (e.g., to perform edge cloud services), and/or at the centralized/enterprise datacenter.

In order to process data (e.g., network edge data such as Internet of Things (IoT) data or mobile device data) using the SCP subsystems/server devices discussed above, multiple services provided by (or across) different SCP subsystems will need to be coordinated. For example, initial data may be transmitted by an application or other data source provided on an IoT device, mobile device, or other initial data source device utilizing the 5G wireless/edge solutions discussed above, and that initial data may require RAN processing, firewall processing, load balancer processing, analytics processing, and/or other data processing known in the art by services provided by multiple SCP subsystems in order to transform that initial data into final data that may be utilized by an application or other data destination. However, because each SCP subsystem may provide multiple services that are utilized to manipulate and/or exchange data, that initial data will likely flow through one or more service(s) included in any particular SCP subsystem, one or more service(s) provided across SCP subsystems in any particular location, and/or one or more service(s) provided across SCP subsystems in different locations, and conventional data flow control systems do not provide any techniques for coordinating the operation of the SCP subsystems such that their services manipulate and exchange the data as discussed above.

Accordingly, it would be desirable to provide a data flow control system that addresses the issues discussed above.

SUMMARY

According to one embodiment, an Information Handling System (IHS) includes a processing subsystem; and a memory subsystem that is coupled to the processing subsystem and that includes instructions that, when executed by the processing subsystem, cause the processing subsystem to provide a graph-based data flow control engine that is configured to: identify a workload; identify one or more services that are provided by a plurality of SCP subsystems and that are configured to manipulate and exchange data to perform the workload; generate a respective SCP-local data flow control graph for each of the plurality of SCP subsystems, where each respective SCP-local data flow control graph defines how the one or more services provided by that SCP subsystem will manipulate and exchange data within that SCP subsystem to perform the workload; generate at least one inter-SCP data flow control graph that defines how the one or more services provided by at least one first SCP subsystem included in the plurality of SCP subsystems will manipulate and exchange data with the one or more services provided by at least one second SCP subsystem included in the plurality of SCP subsystems to perform the workload; and transmit each respective SCP-local data flow control graph to each of the plurality of SCP subsystems, and the at least one inter-SCP data flow control graph to at least one of the plurality of SCP subsystems, wherein the plurality of SCP subsystems are configured to utilize the respective SCP-local data flow control graph and the at least one inter-SCP data flow control graph to cause their one or more services to manipulate and exchange data to perform the workload.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
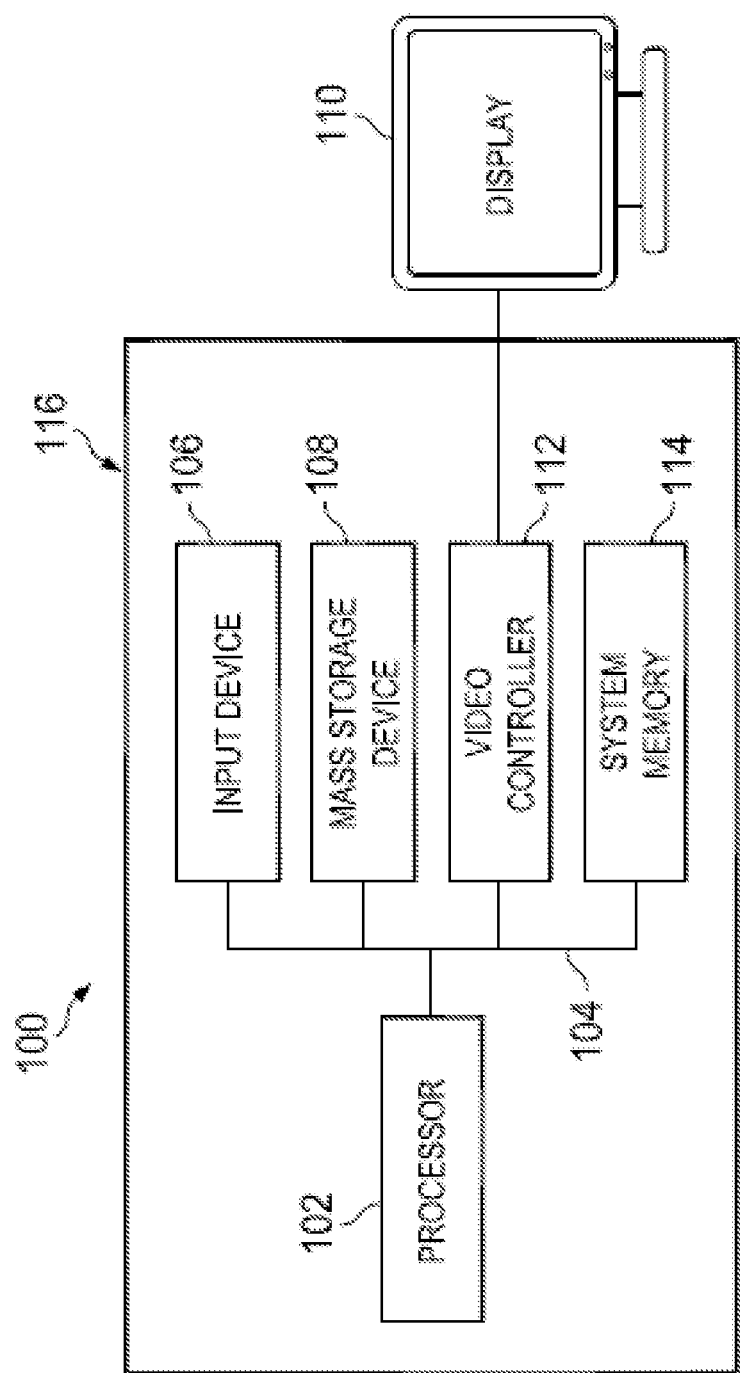
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
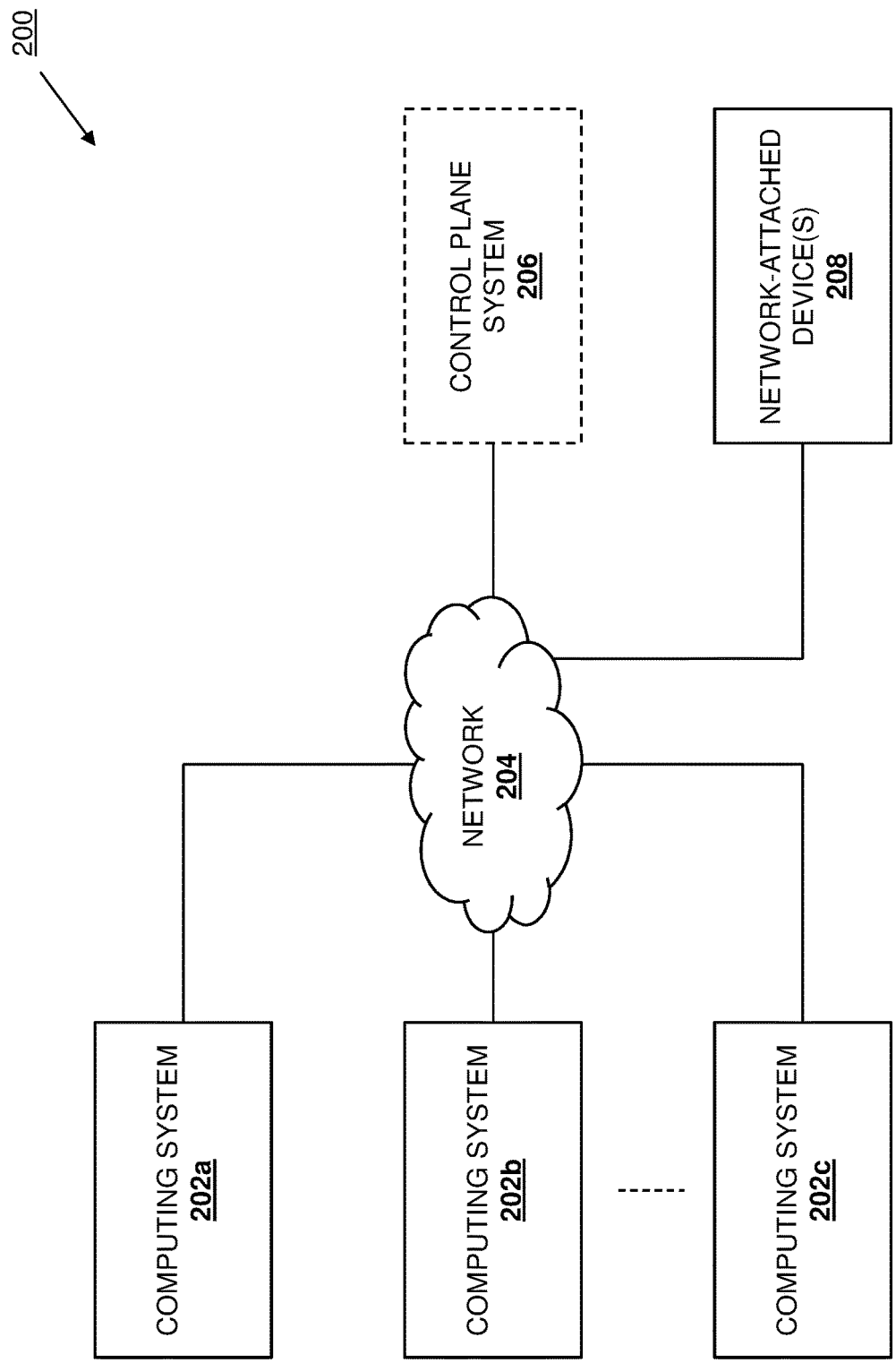
FIG. 2 is a schematic view illustrating an embodiment of a networked system.

Referring now to FIG. 2, an embodiment of a networked system 200 is illustrated in which the graph-based data flow control system of the present disclosure may be utilized. In the illustrated embodiment, the networked system 200 includes a plurality of computing systems 202a, 202b, and up to 202c. In an embodiment, the computing system 202a-202c may be provided by the IHS 100 discussed above with reference to FIG. 1, and/or may include some or all of the components of the IHS 100, and in specific examples may be provided by server devices. However, while discussed as being provided by server devices, one of skill in the art in possession of the present disclosure will recognize that computing systems provided in the networked system 200 may include any computing systems that may be configured to operate similarly as the computing systems 202a-202c discussed below. In the illustrated embodiment, each of the computing systems may be coupled to a network 204 that may be provided by a Local Area Network (LAN), the Internet, combinations thereof, and/or any other networks that would be apparent to one of skill in the art in possession of the present disclosure.

In the illustrated embodiment, a control plane system 206 is also coupled to the network 204. In some embodiments, the control plane system 206 may be provided by the IHS 100 discussed above with reference to FIG. 1, and/or may include some or all of the components of the IHS 100, and in specific examples may be provided by one or more control plane server devices that may be configured to provide graph-based data flow control functionality for the computing systems 202a-202c. However, in other embodiments, the control plane system 206 may be provided by one or more of the SCP subsystems discussed below that may be included in the computing systems 202a-202c, and thus may not be provided by a separate component in the networked system 200 (as illustrated in FIG. 2 by the dashed lines for the control plane system 206). As such, some embodiments may provide the control plane system 206 as a centralized, server-based system that interacts with separate SCP subsystems to perform the graph-based data flow control functionality described herein, while other embodiments may provide the control plane system 206 as a distributed control plane provided by one or more SCP subsystems that perform the graph-based data flow control functionality described herein. In either embodiment, the control plane system 206 may be provided by redundant subsystems (e.g., redundant server devices, redundant SCP subsystem, etc.) in order to ensure high availability of the graph-based data flow control plane discussed below.

In the illustrated embodiment, one or more network-attached devices 208 are also coupled to the network 204. In an embodiment, the network-attached device(s) 208 may be provided by a variety of different network-attached devices that are accessible to the computing systems 202a-202c via the network 204, and in specific examples may be provided by one or more Non-Volatile Memory express (NVMe) storage devices that may be configured to provide a network-attached storage system for any or all of the computing systems 202a-202c. However, while a specific networked system 200 has been illustrated and described, one of skill in the art in possession of the present disclosure will recognize that the graph-based data flow control system of the present disclosure may be utilized with a variety of components and component configurations, and/or may be provided in a variety of computing system/network configurations, while remaining within the scope of the present disclosure as well.

Figure 3A:
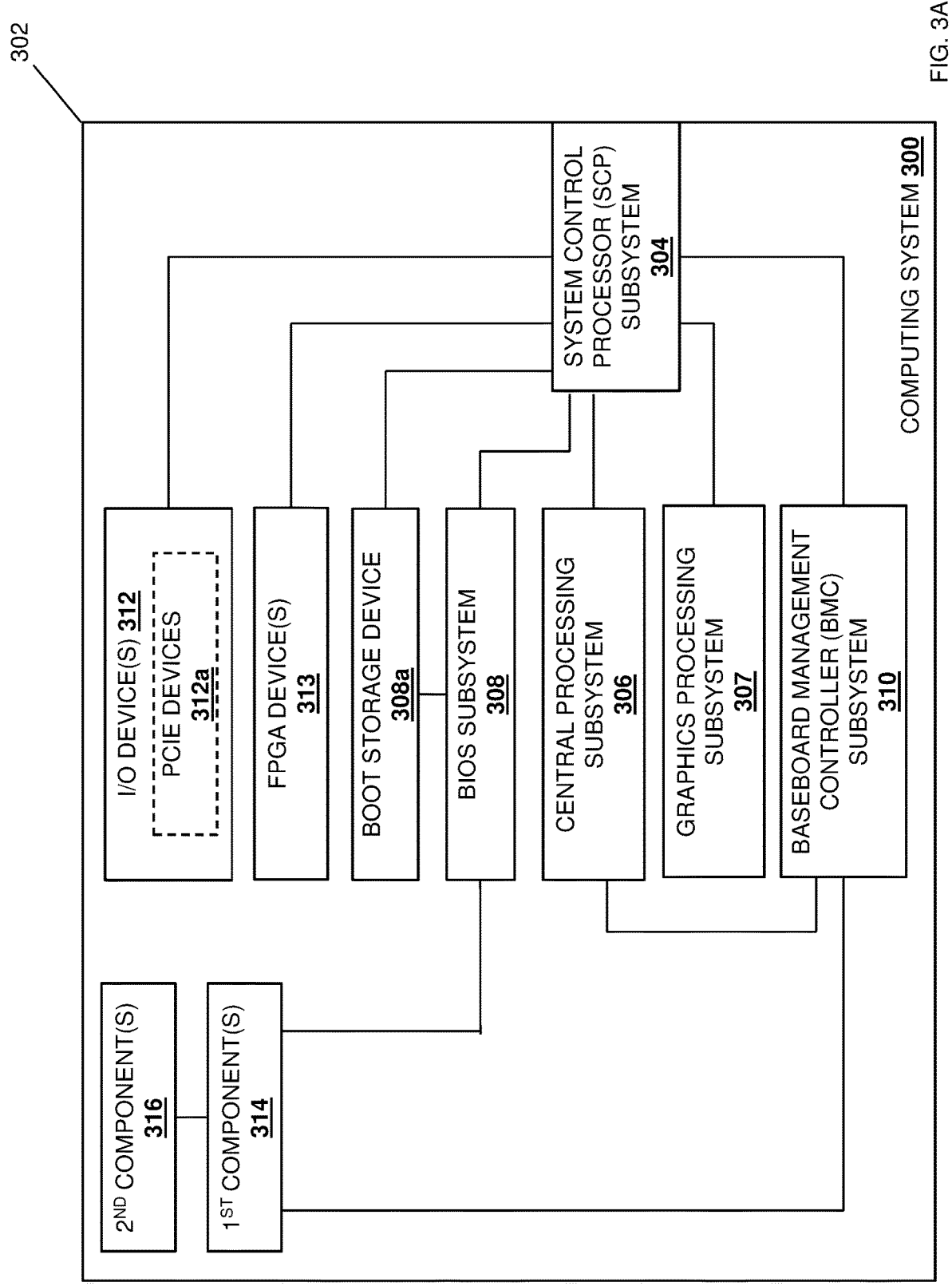
FIG. 3A is a schematic view illustrating an embodiment of a computing system that may be included in the networked system of FIG. 2 and that may utilize the graph-based data flow control system of the present disclosure.

Referring now to FIG. 3A, an embodiment of a computing system 300 is illustrated that may provide any or all of the computing systems 202a-202c discussed above with reference to FIG. 2. As such, the computing system 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing system 300 discussed below may be provided by other computing systems that are configured to operate similarly as the computing system 300 discussed below. In the illustrated embodiment, the computing system 300 includes a chassis 302 that houses the components of the computing system 300, only some of which are illustrated below.

For example, the chassis 302 may house a System Control Processor (SCP) subsystem 304 that is provided according to the teachings of the present disclosure to perform the graph-based data flow control functionality that is discussed in further detail below. In some examples, the SCP subsystem 304 may be conceptualized as an "enhanced" SmartNIC device that may be configured to perform functionality that is not available in conventional SmartNIC devices such as, for example, the platform root-of-trust functionality described by the inventors of the present disclosure in U.S. patent application Ser. No. 17/027,835, filed on Sep. 22, 2020, and the secure communication functionality described by the inventors of the present disclosure in U.S. patent application Ser. No. 17/079,737, filed on Oct. 26, 2020, the disclosures of which are incorporated herein by reference in their entirety. However, while illustrated and described as an enhanced SmartNIC device provided by an SCP subsystem, one of skill in the art in possession of the present disclosure will appreciate that the SCP subsystem 304 may be replaced by a variety of other subsystems that are configured to perform the functionality discussed below while remaining within the scope of the present disclosure as well.

In an embodiment, the SCP subsystem 304 may be provided by the IHS 100 discussed above with reference to FIG. 1 and/or may include some or all of the components of the IHS 100. In specific examples, the SCP subsystem 304 may be provided as an SCP card that is configured to connect to a slot on a motherboard in the chassis 302. In other examples, the SCP subsystem 304 may be integrated into a motherboard in the chassis 302. In yet other examples the SCP subsystem 304 may be a separate/co-motherboard circuit board that is connected to a motherboard in the chassis 302 (e.g., a two-part motherboard having a first portion that enables conventional motherboard functionality, and a second portion that enables the SCP functionality discussed below). However, while a few specific examples are provided, one of skill in the art in possession of the present disclosure will appreciate that the SCP subsystem 304 may be provided in the computing system 300 in a variety of manners that will fall within the scope of the preset disclosure.

The chassis 302 may also house a central processing subsystem 306 that is coupled to the SCP subsystem 304 (e.g., via a Compute Express Link (CxL)), and which may include the processor 102 discussed above with reference to FIG. 1, a Central Processing Unit (CPU) such as a x86 host processor, a CPU memory such as x86 host processor memory, and/or a variety of other processing components that would be apparent to one of skill in the art in possession of the present disclosure. The chassis 302 may also house a graphics processing subsystem 307 that is coupled to the SCP subsystem 304, and which may include the processor 102 discussed above with reference to FIG. 1, a Graphics Processing Unit (GPU), a GPU memory, and/or by a variety of other processing components that would be apparent to one of skill in the art in possession of the present disclosure. As will be appreciated by one of skill in the art in possession of the present disclosure, in the examples illustrated below, the graphics processing subsystem 307 connects to the central processing subsystem 306 via the SCP subsystem 304 such that the SCP subsystem 304 acts as a "host" for the graphics processing subsystem 307, although other central processing subsystem/graphics processing subsystem configurations will fall within the scope of the present disclosure as well.

The chassis 302 may also house a Basic Input/Output System (BIOS) subsystem 308 that is coupled to the SCP subsystem 304 and the central processing system 306, and that one of skill in the art in possession of the present disclosure will recognize as being provided by firmware that is configured to perform hardware initialization for the computing system 300 during a boot process (e.g., power-on startup operations) or other initialization processes known in the art, as well as runtime services for operating systems and/or other applications/programs provided by the computing system 300. Furthermore, while described as a BIOS subsystem, one of skill in the art in possession of the present disclosure will recognize that the BIOS subsystem 308 may be replaced with a Universal Extensible Firmware Interface (UEFI) subsystem, which one of skill in the art in possession of the present disclosure will recognize defines a software interface between an operating system and firmware in the computing system 300, and that was provided to replace BIOS subsystems (while supporting legacy BIOS services).

In the illustrated embodiment, the chassis 302 may also house a boot storage device 308a that is coupled to the SCP subsystem 304 and the BIOS subsystem 308, and that one of skill in the art in possession of the present disclosure will recognize may store a boot image that may be accessible to and utilized by the BIOS subsystem 308 during boot operations. For example, the boot storage device 308a may be provided by Boot Optimized Storage Solution (BOSS) available from DELL® Inc. of Round Rock, Tex., United States, although other boot storage devices will fall within the scope of the present disclosure as well. In the illustrated embodiment, the chassis 302 may also house a Baseboard Management Controller (BMC) subsystem 310 that is coupled to the SCP subsystem 304 and the central processing subsystem 306 (e.g., via a Peripheral Component Interconnect express (PCIe) link), and which one of skill in the art in possession of the present disclosure will recognize as being configured to manage an interface between system management software in the computing system 300 and hardware in the computing system 300, as well as perform other BMC operations that would be apparent to one of skill in the art in possession of the present disclosure.

The chassis 302 may also house (or provide a coupling for) one or more Input/Output (I/O) devices 312 that are coupled to the SCP subsystem 304. As such, one of skill in the art in possession of the present disclosure will recognize that the I/O device(s) 312 may be housed in the chassis 302 and connected to an internal connector (e.g., on a motherboard in the chassis 302), or may be provided external to the chassis 302 and connected to an external connector (e.g., on an outer surface the chassis 302). As illustrated in FIG. 3A, the I/O device(s) 312 may include one or more Peripheral Component Interconnect express (PCIe) devices 312a (as the I/O device(s) 312 or in addition to other I/O device(s)). For example, the PCIe device(s) 312a may include NVMe storage devices that are house in the chassis 302 (i.e., and connected to an internal connector on a motherboard in the chassis 302), or that are external to the chassis 302 (i.e., and connected to an external connector on an outer surface of the chassis 302). However, while particular I/O devices and/or PCI devices have been described, one of skill in the art in possession of the present disclosure will recognize that a variety of other I/O devices will fall within the scope of the present disclosure as well. The chassis 302 may also house one or more Field Programmable Gate Array (FPGA) device(s) 313 that are coupled to the SCP subsystem 304, and that as discussed below may be programmed to perform any of a variety of functions for the computing system 300 and/or the SCP subsystem 304.

Figure 3B:
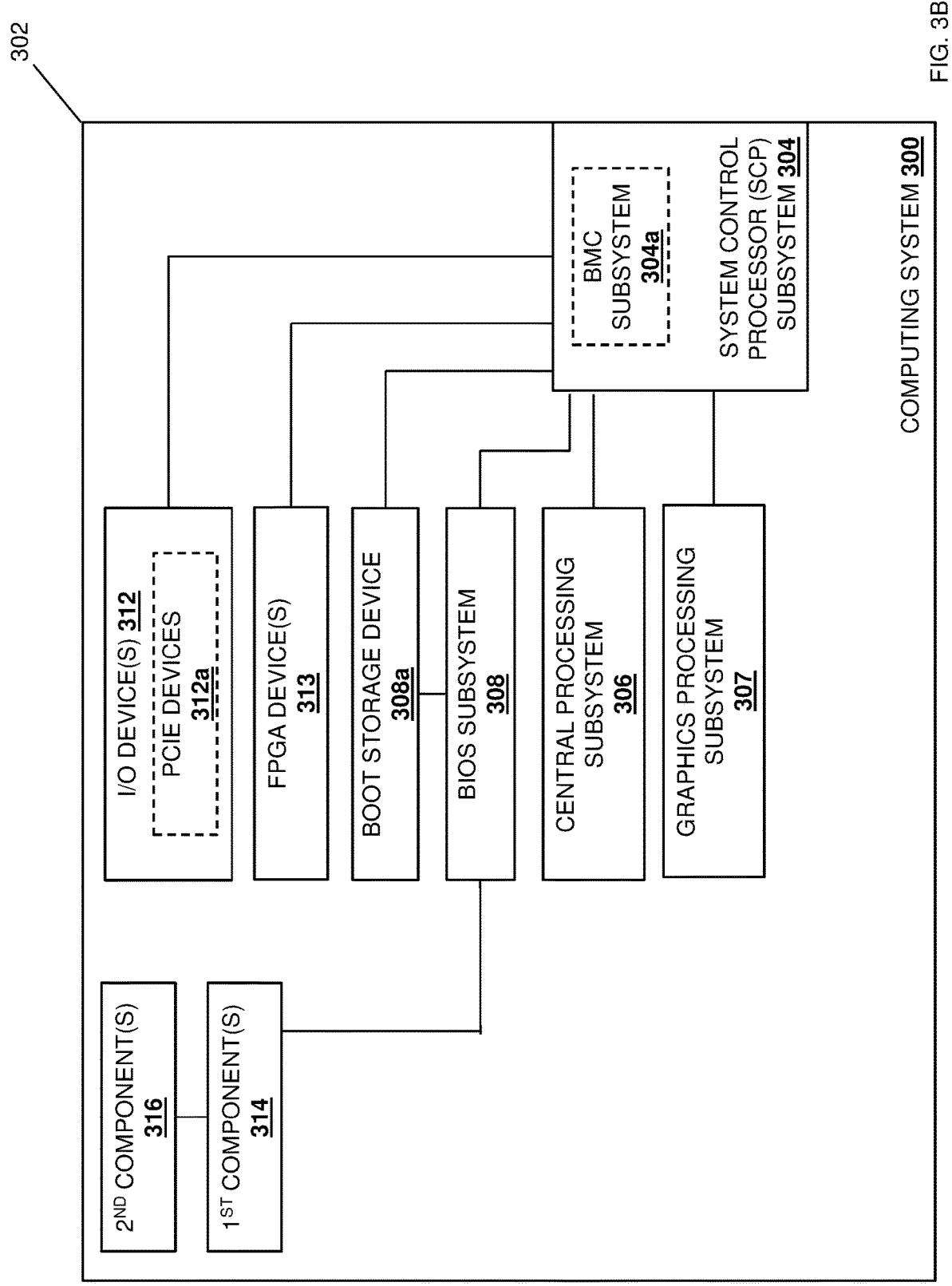
FIG. 3B is a schematic view illustrating an embodiment of a computing system that may be included in the networked system of FIG. 2 and that may utilize the graph-based data flow control system of the present disclosure.

The chassis 302 may also house one or more first components 314 that are coupled to each of the BIOS subsystem 308 and the BMC subsystem 310, and one or more second components 316 that are coupled to at least one of the first components 314. In specific examples, the first component(s) 314 and the second component(s) 316 may include a Complex Programmable Logic Device (CPLD), a power system, and/or a variety of other computing system components known in the art. However, while a specific computing system 300 has been illustrated, one of skill in the art in possession of the present disclosure will recognize that computing systems (or other devices operating according to the teachings of the present disclosure in a manner similar to that described below for the computing system 300) may include a variety of components and/or component configurations for providing conventional computing system functionality, as well as the functionality discussed below, while remaining within the scope of the present disclosure as well. For example, FIG. 3B illustrates an embodiment of the computing system 300 in which the BMC subsystem 310 described above with reference to FIG. 3A is omitted, and the SCP subsystem 304 is configured to provide a BMC subsystem 304a that performs the functionality of the BMC subsystem 310 in FIG. 3A.

Figure 4:
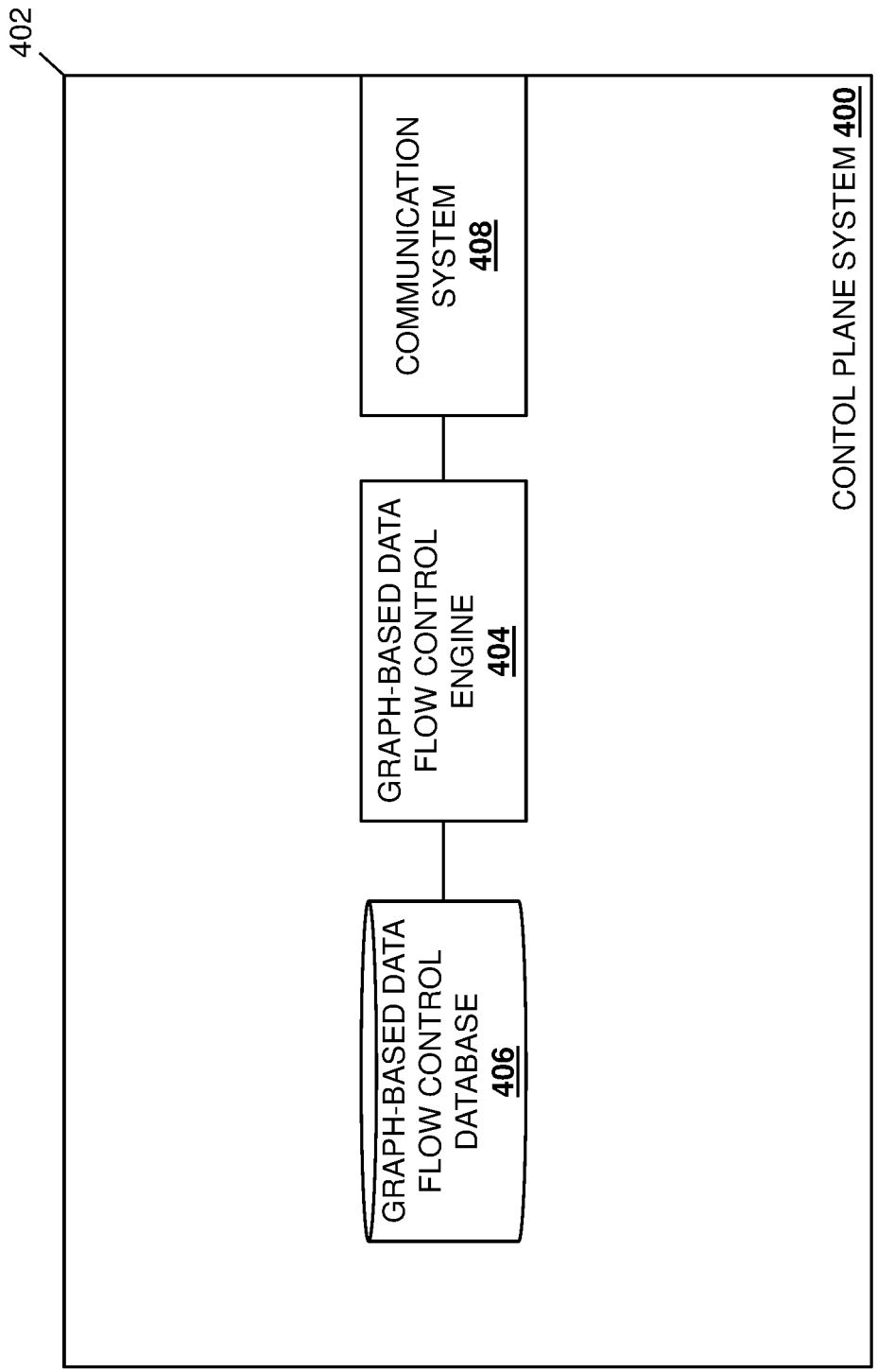
FIG. 4 is a schematic view illustrating an embodiment of a control plane system that may be included in the networked system of FIG. 2, and that may provide the graph-based data flow control system of the present disclosure.

Referring now to FIG. 4, an embodiment of a control plane system 400 is illustrated that may provide the control plane system 206 discussed above with reference to FIG. 2. As such, the control plane system 400 may be provided by the IHS 100 discussed above with reference to FIG. 1 and/or may include some or all of the components of the IHS 100, and in some specific examples may be provided by one or more server devices, while in other specific examples may be provided by one or more of the SCP subsystems described herein. However, while illustrated and discussed as being provided in different manners in the networked system 200, one of skill in the art in possession of the present disclosure will recognize that the functionality of the control plane system 400 discussed below may be provided by other devices that are configured to operate similarly as the control plane system 400 discussed below.

In the illustrated embodiment, the control plane system 400 includes a chassis 402 including the components of the control plane system 400, only some of which are illustrated below. For example, the chassis 402 may include a processing subsystem including one or more processors (not illustrated, but which may include the processor 102 discussed above with reference to FIG. 1) and a memory subsystem (not illustrated, but which may include the memory 114 discussed above with reference to FIG. 1) that is coupled to the processing subsystem and that includes instructions that, when executed by the processing subsystem, cause the processing subsystem to provide a graph-based data flow control engine 404 that is configured to perform the functionality of the graph-based data flow control engines and/or control plane systems discussed below.

The chassis 402 may also include a storage subsystem (not illustrated, but which may include the storage 108 discussed above with reference to FIG. 1, etc.) that is coupled to the graph-based data flow control engine 404 (e.g., via a coupling between the storage subsystem and the processing subsystem), and that may include a graph-based data flow control database 406 that may store any of the information utilized by the graph-based data flow control engine 404 as discussed below. The chassis 302 may also include a communication system 408 that is coupled to the graph-based data flow control engine 404 (e.g., via a coupling between the communication system 408 and the processing subsystem) and that may include a Network Interface Controller (NIC) device, as well as any other communication components (e.g., wireless communication systems (e.g., BLUETOOTH®, Near Field Communication (NFC) components, WiFi components, etc.)) that would be apparent to one of skill in the art in possession of the present disclosure.

Figure 5:
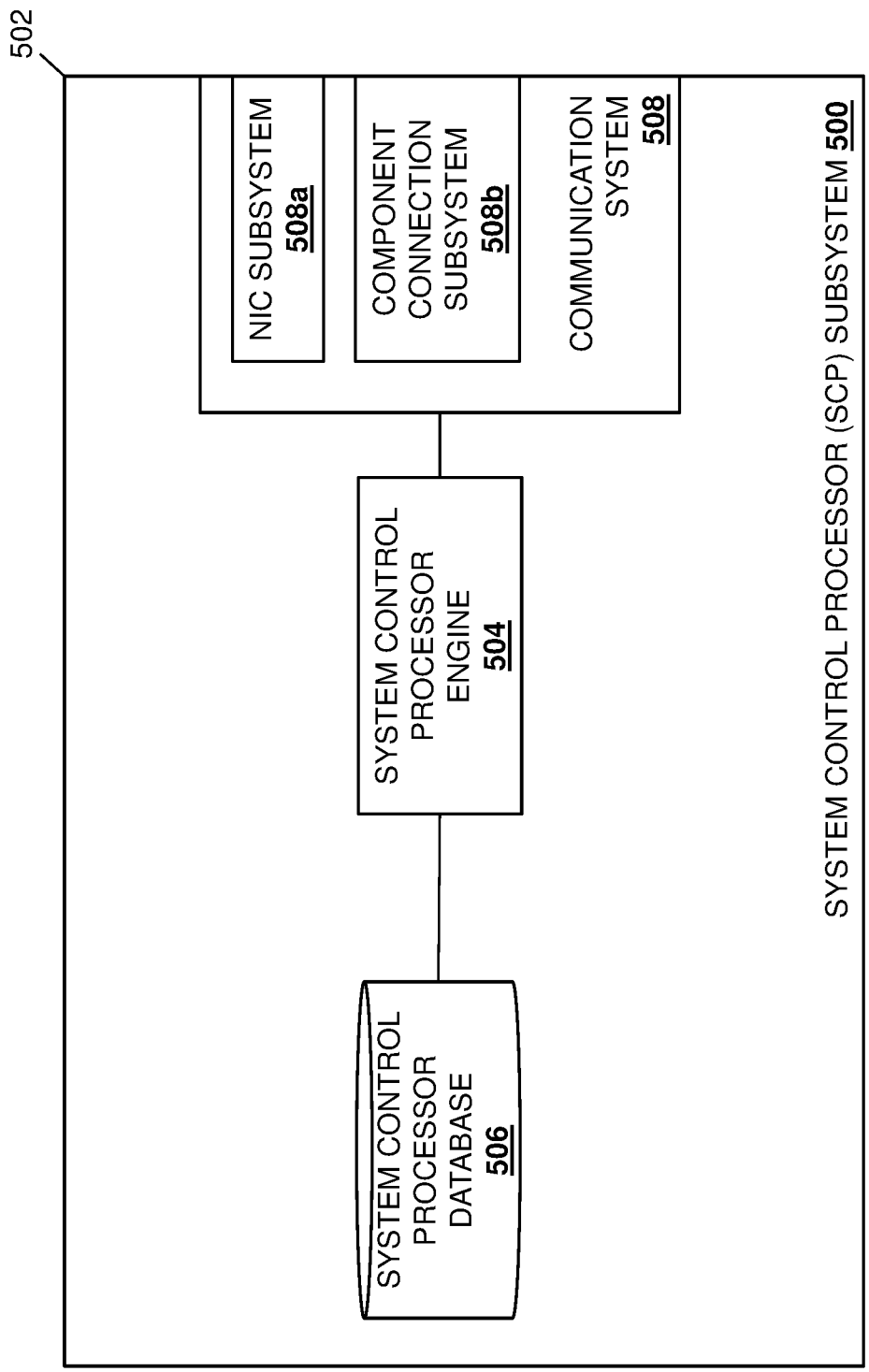
FIG. 5 is a schematic view illustrating an embodiment of an SCP subsystem that may be included in the computing system of FIGS. 3A or 3B, and that may provide the graph-based data flow control system of the present disclosure.

Referring now to FIG. 5, an embodiment of an SCP subsystem 500 is illustrated that may provide the SCP subsystem 304 discussed above with reference to FIGS. 3A and 3B. As such, the SCP subsystem 500 may be provided by the IHS 100 discussed above with reference to FIG. 1 and/or may include some or all of the components of the IHS 100, and in specific examples may be provided as an SCP card, may be integrated into a motherboard, or may be provided as a separate/co-motherboard circuit board. However, while illustrated and discussed as being provided in different manners in a computing system 300, one of skill in the art in possession of the present disclosure will recognize that the functionality of the SCP subsystem 500 discussed below may be provided by other devices that are configured to operate similarly as the SCP subsystem 500 discussed below.

In the illustrated embodiment, the SCP subsystem 500 includes a chassis 502 (e.g., a circuit board) that supports the components of the SCP subsystem 500, only some of which are illustrated below. For example, the chassis 502 may support an SCP processing subsystem including one or more SCP processors (not illustrated, but which may include the processor 102 discussed above with reference to FIG. 1) and an SCP memory subsystem (not illustrated, but which may include the memory 114 discussed above with reference to FIG. 1) that is coupled to the SCP processing subsystem and that includes instructions that, when executed by the SCP processing subsystem, cause the SCP processing subsystem to provide an SCP engine 504 that is configured to perform the functionality of the SCP engines and/or SCP subsystems discussed below. In a specific example, the SCP processing subsystem providing the SCP engine 504 may be provided by ARM processor cores in an ARM-based processor, although other processing systems will fall within the scope of the present disclosure as well.

The chassis 502 may also support an SCP storage subsystem (not illustrated, but which may include the storage 108 discussed above with reference to FIG. 1, the SCP memory system discussed above, etc.) that is coupled to the SCP engine 504 (e.g., via a coupling between the SCP storage subsystem and the SCP processing subsystem), and that may include an SCP database 506 that may store any of the information utilized by the SCP engine 504 as discussed below. The chassis 502 may also support a communication system 508 that is coupled to the SCP engine 504 (e.g., via a coupling between the communication system 508 and the SCP processing subsystem) and that, in the illustrated embodiment, includes a Network Interface Controller (NIC) subsystem 508a (e.g., an Ethernet subsystem) that is configured to connect the SCP subsystem 500 to the network 204 discussed above with reference to FIG. 2, a component connection subsystem 508b that is configured to couple the SCP subsystem 500 to any of the components included in and/or connected to the computing system 300 of FIGS. 3A and 3B, as well as any other communication components (e.g., wireless communication systems (e.g., BLU-ETOOTH®, Near Field Communication (NFC) components, WiFi components, etc.)) that would be apparent to one of skill in the art in possession of the present disclosure.

As such, the communication system 508 may include any of the connections between the SCP subsystem 500 and the network 204, the central processing subsystem 306, the graphics processing subsystem 307, the BIOS subsystem 308, the boot storage device 308a, the BMC subsystem 310, the I/O device(s) 312, the FPGA device(s) 313, and/or any other components utilized with the computing system 202a/300. For example, the component connection subsystem 508b may include a CxL Root .mem/.cache subsystem coupled to the central processing subsystem 306, and Out-Of-Band (OOB) management subsystem coupled to the BMC subsystem 310, and a CxL host subsystem coupled to the components in the computing system 300. However, while a specific SCP subsystem 500 has been illustrated and described, one of skill in the art in possession of the present disclosure will recognize that SCP subsystems (or other devices operating according to the teachings of the present disclosure in a manner similar to that described below for the SCP subsystem 500) may include a variety of components (e.g., a local memory, embedded FPGA device(s), a Non-Volatile Memory express (NVMe) emulation subsystem between the SCP engine 504 and the CxL Root .mem/.cache subsystem discussed above, etc.) and/or component configurations for providing the functionality discussed below while remaining within the scope of the present disclosure as well.

Figure 6:
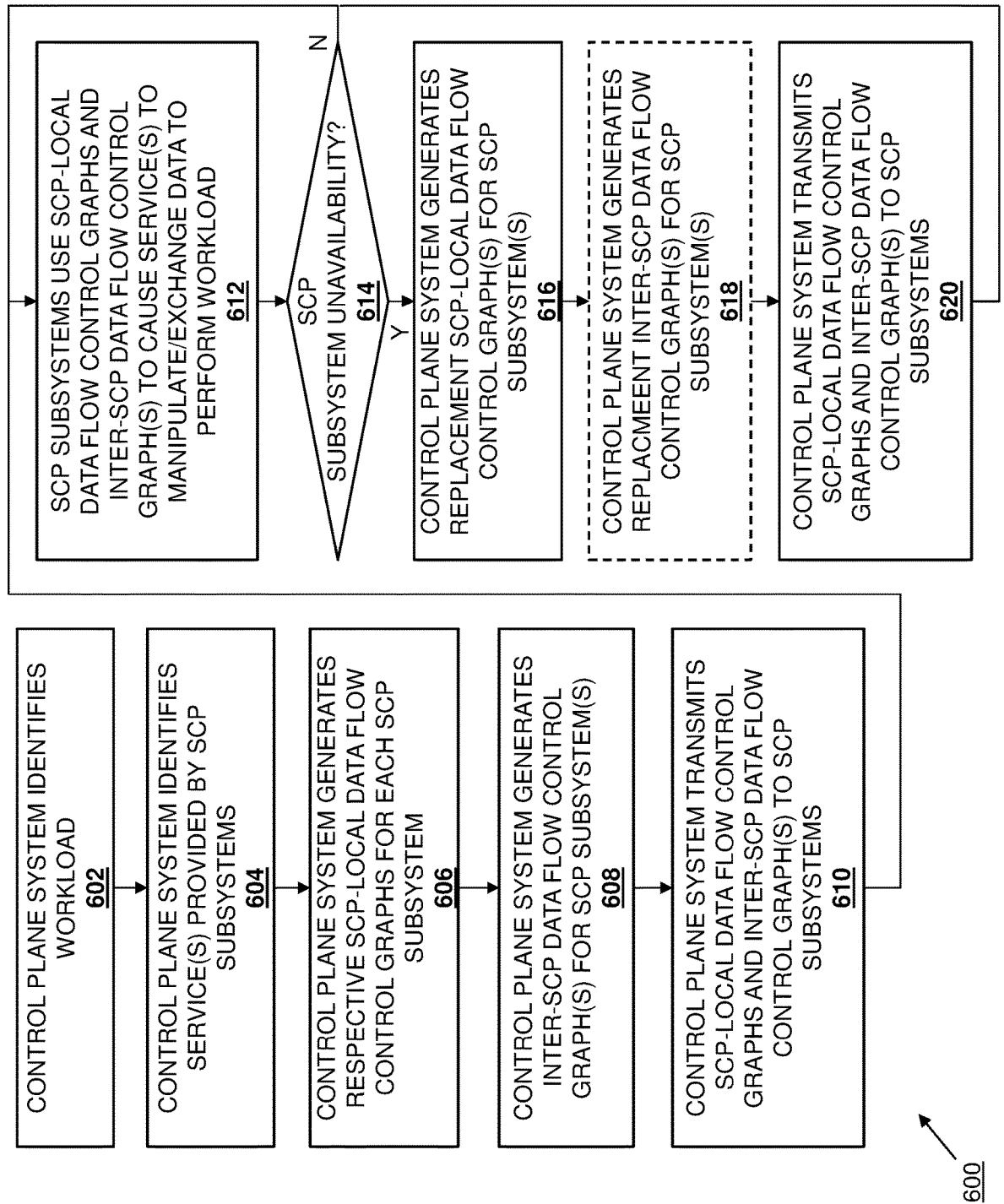
FIG. 6 is a flow chart illustrating an embodiment of a method for providing graph-based data flow control.

Referring now to FIG. 6, an embodiment of a method 600 is illustrated for providing graph-based data flow control. As discussed below, embodiments of the systems and methods of the present disclosure provide for the control of data flow within and between SCP subsystems using data flow control graphs that provide for the manipulation and exchange of data by the SCP subsystems in a manner required to perform a workload. For example, the graph-based data flow control system of the present disclosure may include a control plane system coupled to SCP subsystems. The control plane system identifies a workload, and identifies service(s) on the SCP subsystems for manipulating/exchanging data to perform the workload. The control plane system generates a respective SCP-local data flow control graph for each SCP subsystem that defines how their service(s) will manipulate/exchange data within that SCP subsystem, and generates inter-SCP data flow control graph(s) that define how service(s) provided by at least one SCP subsystem will manipulate/exchange data with service(s) provided by at least one other SCP subsystem. The control plane system then transmits each respective SCP-local data flow control graph to each of the SCP subsystems, and the inter-SCP data flow control graph(s) to at least one SCP subsystem, and the SCP subsystems use those data flow control graphs to cause their service(s) to manipulate/exchange data to perform the workload. As such, multiple services provided by (or across) different SCP subsystems may be coordinated to manipulate and exchange data that may be received from an initial data source/application in order to transform that initial data into final data that may be provided to a final data destination/application as defined by a workload.

In some embodiments, during or prior to the method 600, the SCP subsystems in the computing systems included in the networked system 200 may authenticate the computing devices in their respective computing systems. As such, any of the SCP subsystems 304 in the computing systems 202a/300, 202b/300, and/or 202c/300 may operate to authenticate the computing devices in its respective computing system. For example, the SCP engine 504 in each of the SCP subsystems 304/500 in the computing systems 202a-202c/300 may be configured to perform the platform root-of-trust functionality described by the inventors of the present disclosure in U.S. patent application Ser. No. 17/027,835, filed on Sep. 22, 2020, the disclosure of which is incorporated herein by reference in its entirety.

Thus, as described in that application, each SCP subsystem may initialize, validate its SCP subsystem initialization information (e.g., an SCP boot image) as part of its SCP initialization operations, use the validated SCP subsystem initialization information to complete its SCP initialization operations, validate BIOS subsystem initialization information (e.g., a BIOS boot image) for the BIOS subsystem in its computing system so that the BIOS subsystem may utilize that BIOS subsystem initialization information to complete BIOS subsystem initialization operations, validate BMC subsystem initialization information (e.g., a BMC boot image) for the BMC subsystem in its computing system so that the BMC subsystem may utilize that BMC subsystem initialization information to complete BMC subsystem initialization operations, and/or validate I/O device initialization information (e.g., an I/O boot image) for the I/O device(s) in its computing system so that the I/O device(s) may utilize that I/O device initialization information to complete I/O device initialization operations. As such, as described in that application, the SCP subsystem in each computing system may ensure the validated operations of each of the subsystems/devices/components included in its computing system.

Furthermore, as also described in that application, the "chain-of-trust" between any SCP subsystem and the systems/devices/components included in its computing system that are directly connected to that SCP subsystem may be extended to systems/devices/components included in its computing system that are indirectly coupled to that SCP subsystem. For example, any validated subsystem/device/component that is directly connected to an SCP subsystem in a computing system may operate to ensure the validated operations of each of the subsystems/devices/components in that computing system that it is directly connected to such that systems/devices/components that are indirectly connected to the SCP subsystem are validated as well. Further still, validated systems/devices/components that are indirectly connected to the SCP subsystem in any computing system may operate to ensure the validated operations of each of the subsystems/devices/components in its computing system that it is directly connected to, and so on. As such, a "chain-of-trust" may be provided between the SCP subsystem and every subsystem/device/component in its computing system. As also discussed in that application, the SCP subsystem in any computing system may also operate to validate firmware updates for the subsystems/devices/components in its computing system, cause the erasure of portions of non-volatile storage subsystems in its computing system, and/or perform any other functionality described in that application during the method 600.

In some embodiments, the authentication of any SCP subsystem and the subsystems/devices/components in any computing system may include the authentication of the control plane system 206 as well. For example, when the control plane system 206 is provided by centralized server devices, the control plane system 206 may be configured to authenticate its operation in a manner similarly to that described above for the SCP subsystems/computing systems, and/or using other authentication techniques known in the art. In other examples, when the control plane system 206 is provided in a distributed manner by one or more of the SCP subsystems 304/500, the control plane system 206 may be authenticated as part of the platform root-of-trust functionality performed by those SCP subsystem(s) as discussed above.

Furthermore, during or prior to the method 600, the SCP subsystems may establish secure communication channels with each other. For example, the SCP engine 504 in each of the SCP subsystems 304/500 in the computing systems 202a-202c/300 may be configured to perform the secure communication functionality described by the inventors of the present disclosure in U.S. patent application Ser. No. 17/079,737, filed on Oct. 26, 2020, the disclosure of which is incorporated herein by reference in its entirety. Thus, as described in that application, the SCP subsystem 304 in the computing system 202b/300 may identify the SCP subsystem 304 in the computing system 202a/300, sign a second SCP authentication communication with a second private key, and transmit the second signed SCP authentication communication to the SCP subsystem 304 in the computing system 202a/300, while the SCP subsystem 304 in the computing system 202a/300 signs a first SCP authentication communication with a first private key, and transmits the first signed SCP authentication communication to the SCP subsystem 304 in the computing system 202b/300. The SCP subsystem 304 in the computing system 202b/300 may then authenticate the first SCP authentication communication using a first public key, the SCP subsystem 304 in the computing system 202a/300 may authenticate the second SCP authentication communication using a second public key and, in response, the SCP subsystems 304 in the computing systems 202a/300 and 202b/300 will establish a secure communication channel.

As also described in that application, the SCP subsystem 304 in the computing system 202b/300 may then identify the SCP subsystem 304 in the computing system 202c/300, sign a second SCP authentication communication with a second private key, and transmit the second signed SCP authentication communication to the SCP subsystem 304 in the computing system 202c/300, while the SCP subsystem 304 in the computing system 202c/300 signs a third SCP authentication communication with a third private key, and transmits the third signed SCP authentication communication to the SCP subsystem 304 in the computing system 202b/300. The SCP subsystem 304 in the computing system 202b/300 may then authenticate the third SCP authentication communication using a third public key, the SCP subsystem 304 in the computing system 202c/300 may authenticate the second SCP authentication communication using a second public key and, in response, the SCP subsystems 304 in the computing systems 202b/300 and 202c/300 will establish a secure communication channel.

As also described in that application, the SCP subsystem 304 in the computing system 202b/300 may then attest to the authentication of the SCP subsystem 304 in the computing system 202c/300 to the SCP subsystem 304 in the computing system 202a/300, and attest to the authentication of the SCP subsystem 304 in the computing system 202a/300 to the SCP subsystem 304 in the computing system 202c/300, which allows the SCP subsystems 304 in the computing systems 202a/300 and 202c/300 to establish a secure communication channel without transmitting signed SCP authentication communications. Furthermore, any SCP subsystem (or the control plane system 206) authenticated by an SCP subsystem may have its authentication attested to other SCP subsystems to quickly and securely grow the secure communication fabric between the SCP subsystems (and the control plane system). As also described in that application, enabling keys may provide for use of the secure communication channels by each of the SCP subsystems 304 in the computing systems 202a/300, 202b/300, and 202c/300 (and the control plane system 206) to securely exchange communications, and continued performance of the platform root-of-trust functionality discussed above by those SCP subsystems (and the control plane system 206) will ensure that the secure communication channels are only maintained with trusted control plane systems, SCP subsystems, and/or computing systems.

Figure 7:
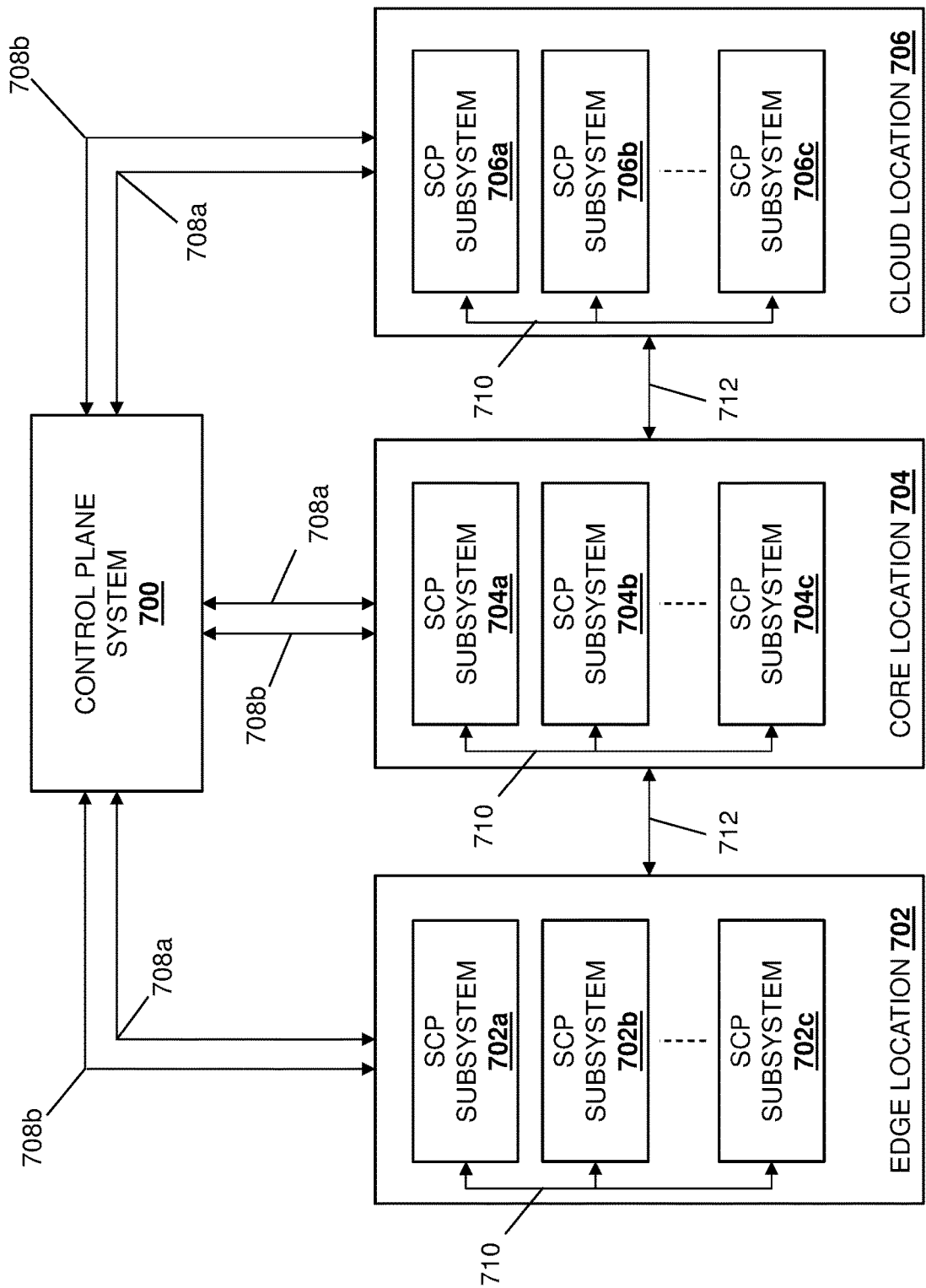
FIG. 7 is a schematic view illustrating an embodiment of the communicative connections between the control plane system of FIG. 4 and the SCP subsystems of FIG. 5 in the networked system of FIG. 2.

As such, secure communication channels may be established between the control plane system 206 and the SCP subsystems 304 in the computing systems 202a-202c/300 that each operate as trusted systems. For example, with reference to FIG. 7, a control plane system 700 (which may be provided by the control plane system 206) is illustrated coupled to SCP subsystems 702a, 702b, and up to 702c provided at an edge location 702 (any of which may be provided by the SCP subsystem 304 in any of the computing systems 202a-202c/300); SCP subsystems 704a, 704b, and up to 704c provided at a core location 704 (any of which may be provided by the SCP subsystem 304 in any of the computing systems 202a-202c/300); and SCP subsystems 706a, 706b, and up to 706c provided at a cloud location 706 (any of which may be provided by the SCP subsystem 304 in any of the computing systems 202a-202c/300). As illustrated in FIG. 7, the control plane system 700 may be coupled to the SCP subsystems in each of the edge location 702, the core location 704, and the cloud location 706 via a plurality of the secure communication channels discussed above that are described below as including a graph orchestration channel 708a and a telemetry/failure recovery channel 708b, with the separate secure communication channels enabling, for example, different policies (e.g., security policies) for the different data transmitted over those secure communication channels. However, while two specific secure communication channels between the control plane system 700 and SCP subsystems are illustrated and described, one of skill in the art in possession of the present disclosure will appreciate that other control plane system/SCP subsystem secure communication channels will fall within the scope of the present disclosure as well.

As also illustrated in FIG. 7, the SCP subsystems in any of the edge location 702, the core location 704, and the cloud location 706 may be coupled together by the secure communication channels discussed above that are described below as secure intra-location communication channels 710, while one or more SCP subsystems in any two of the edge location 702, the core location 704, and the cloud location 706 may be coupled together by the secure communication channels discussed above that are described below as secure inter-location communication channels 712. Furthermore, one of skill in the art in possession of the present disclosure will appreciate that multiple secure intra-location communication channels may be provided to enable, for example, different policies (e.g., security policies) for the different data transmitted over those secure communication channels. However, while specific secure communication channels between SCP subsystems are illustrated and described, one of skill in the art in possession of the present disclosure will appreciate that other SCP subsystem secure communication channels will fall within the scope of the present disclosure as well.

Thus, during or prior to the method, the control plane system 206/700 and SCP subsystems 304 discussed below may be configured to perform secured and trusted communications with each other in order to ensure the security of the graph orchestration, telemetry data exchange, failure recovery operations, data flow control operations, and data flow operations described herein. Furthermore, one of skill in the art in possession of the present disclosure will recognize that the networked system illustrated in FIG. 7 provides an example of an edge/core/cloud configuration that may be utilized in 5G wireless/edge solutions, but will appreciate that the graph-based data flow control functionality discussed below may be utilized in a variety of other solutions such as, for example, datacenter solutions that include SCP subsystems that perform infrastructure delivery services, while remaining within the scope of the present disclosure as well.

The method 600 may begin at block 602 where a control plane system identifies a workload. In an embodiment, at block 602, the graph-based data flow control engine 404 in the control plane system 206/400 may identify a workload by, for example, receiving a workload performance request via its communication system 408. As will be appreciated by one of skill in the art in possession of the present disclosure, the workload performance request received by the graph-based data flow control engine 404 in the control plane system 206/400 may be provided by a network administrator or other user of the networked system 200, by one of the computing systems 200a-200c, by one of the SCP subsystems 304 in the computing systems 202a-202c/300, and/or by any other workload provisioning entity known in the art. Using the 5G wireless/edge solution example above, the workload may include workload requirements and/or operation such as receiving initial data transmitted by an IoT device, mobile device, or other initial data source/application, performing RAN processing on that data, firewall processing on that data, load balancer processing on that data, analytics processing on that data, and/or other data processing known in the art on that data in order to transform that initial data into final data, and providing that final data to a final data destination/application or other final data consumer. However, one of skill in the art in possession of the present disclosure will appreciate that the workload identified at block 602 may include any of a variety of workload requirements and/or operations that detail how initial data received from an initial data source/application should be manipulated and exchanged in order to produce final data to a final data destination/application.

Figure 8:
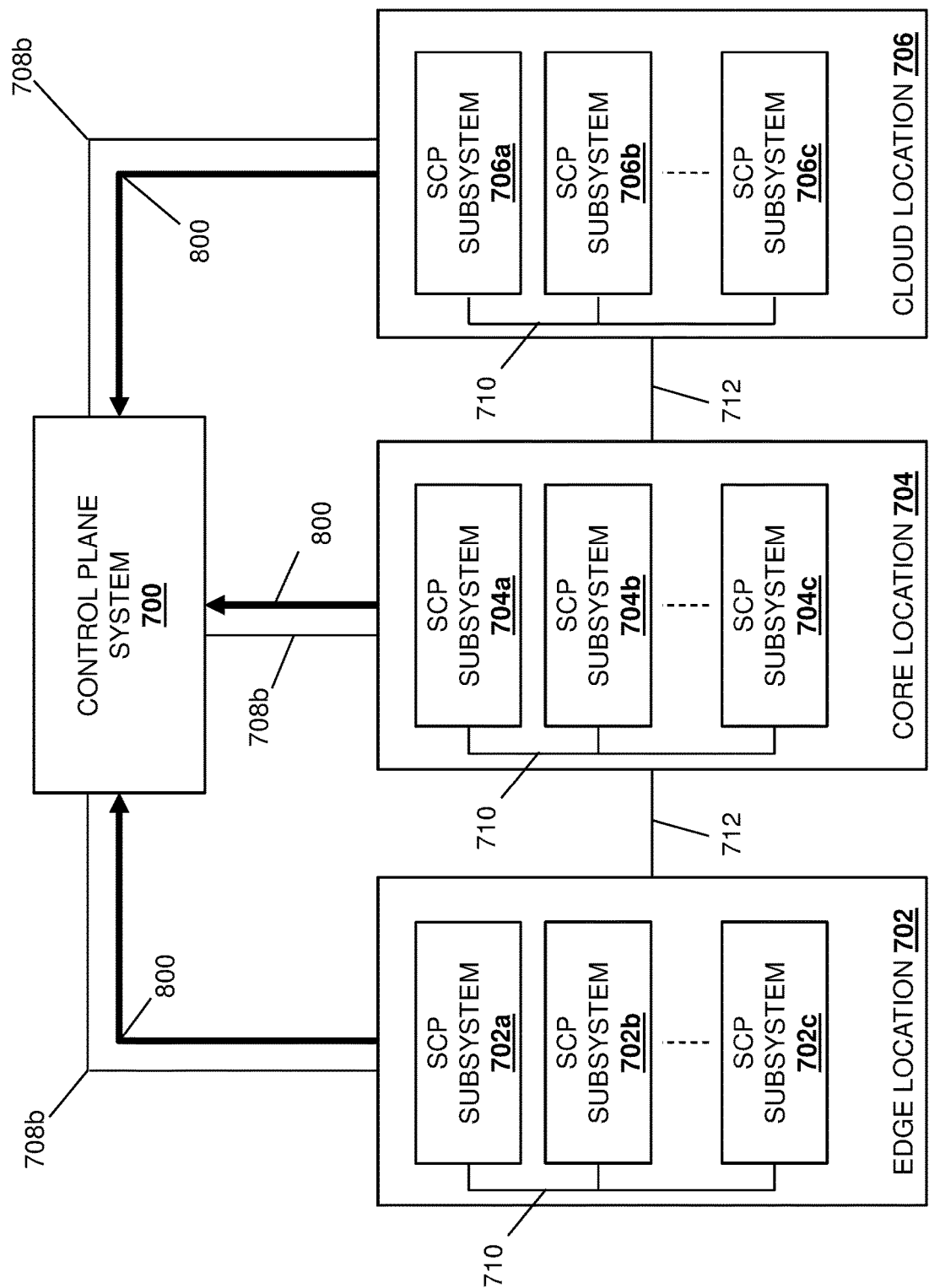
FIG. 8 is a schematic view illustrating an embodiment of the control plane system of and the SCP subsystems of FIG. 7 operating during the method of FIG. 5.

The method 600 then proceeds to block 604 where the control plane system identifies one or more services provide by a plurality of SCP subsystems. With reference to FIG. 8, in an embodiment of block 604, the graph-based data flow control engine 404 in the control plane system 206/400/700 may perform service identification operations 800 that include identifying, via its communication system 408 and the graph orchestration channel 708a provided with each SCP subsystem 702a-702c in the edge location 702, each SCP subsystem 704a-704c in the core location 704, and each SCP subsystem 706a-706c in the cloud location 706, one or more services provided by each of those SCP subsystems. As discussed in further detail below, the SCP subsystem 304 in each of the computing systems 202a-202c/300 may be configured to provide one or more services (e.g., one or more trusted applications and/or other data manipulation/exchange instruction sets that may be performed using any components in that SCP subsystem, in its computing system, and/or accessible to that SCP subsystem via the network 204) that operate to manipulate first data located at a first "data node" to produce second data that is exchanged from the first "data node" to a second "data node", with each "data node" representing a data/work product.

In one specific example, a service provided by an SCP subsystem may be a compression service that operates to compress uncompressed data (e.g., a first data/work product) located at a first "data node" to compress the uncompressed data and exchange it from the first "data node" to a second "data node" to provide compressed data (e.g., a second data/work product) at the second "data node". In another specific example, a service provided by an SCP subsystem may be an encryption service that operates to encrypt unencrypted data (e.g., a first data/work product) located at a first "data node" to encrypt the unencrypted data that is exchanged from the first "data node" to a second "data node" to provide encrypted data (e.g., a second data/work product) at the second "data node". In another specific example, a service provided by an SCP subsystem may be a data transmission service that operates to exchange first data located at a first "data node" (e.g., a first data/work product) at no less than a minimum data transmission speed to a second "data node" (e.g., a second data/work product that is the same as the first data/work product but that has been transmitted at no less than the minimum data transmission speed). However, while several specific examples are described, one of skill in the art in possession of the present disclosure will appreciate that SCP subsystems may be configured to provide any of a wide variety of services that will fall within the scope of the present disclosure as well, and any of those services may be identified at block 504.

Furthermore, while the identification of services provided by SCP subsystems is illustrated and described as being performed subsequent to the identification of the workload at block 502, one of skill in the art in possession of the present disclosure will appreciate that the identification of services provided by SCP subsystems may be performed prior to the identification of the workload while remaining within the scope of the present disclosure as well. For example, the graph-based data flow control engine 404 in the control plane system 206/400 may identify any services provided by the SCP subsystems and store that information in the graph-based data flow control database 406, and then subsequently identify workloads that may be performed using one or more of those services in the manner described below.

The method 600 then proceeds to block 606 where the control plane system generates respective SCP-local data flow control graphs for each of the plurality of SCP subsystem. In an embodiment, at block 606, the graph-based data flow control engine 404 in the control plane system 206/400/700 may operate to generate SCP-local data flow control graphs that define how one or more of the SCP subsystem 702a-702c in the edge location 702, one or more of the SCP subsystem 704a-704c in the core location 704, and one or more of the SCP subsystem 706a-706c in the cloud location 706 will utilize one or more of their service(s) identified at block 604 to manipulate and exchange data to perform the workload identified at block 602. For example, in response to identifying the workload at block 602, the graph-based data flow control engine 404 in the control plane system 206/400/700 may select a subset of the service(s) identified at block 604 in order to generate SCP-local data flow control graphs for each SCP subsystem that includes a service that is needed to manipulate and/or exchange data in order to perform the workload, with each SCP-local data flow control graph defining how service(s) in one of those SCP subsystems will manipulate and exchange data between each other.

In a specific example, at block 606 the graph-based data flow control engine 404 in the control plane system 206/400/700 may first generate a global data flow control graph that generally defines the services that will be needed to perform the workload (e.g., the RAN processing, firewall processing, load balancer processing, and analytics processing described in the example above), and then select the particular service(s) provided by the SCP subsystems that accomplish the services defined in the global data flow control graph, and then generate the SCP-local data flow control graphs to define how those services with manipulate and exchange data to perform the workload (e.g., a first SCP-local data flow control graph that defines how service(s) in a first SCP subsystem will receive initial data and manipulate and exchange data to accomplish the RAN processing, a second SCP-local data flow control graph that defines how service(s) in a second SCP subsystem will receive RAN processed data and manipulate and exchange the RAN processed data to accomplish the firewall processing, a third SCP-local data flow control graph that defines how service(s) in a third SCP subsystem will receive RAN/fireless processed data and manipulate and exchange the RAN/firewall processed data to accomplish the load balancer processing, and a fourth SCP-local data flow control graph that defines how service(s) in a fourth SCP subsystem will receive RAN/fireless/load balancing processed data and manipulate and exchange the RAN/firewall/load balancing processed data to accomplish the analytics processing). However, while a specific example is provided, one of skill in the art in possession of the present disclosure will appreciate SCP-local data flow control graphs may define how service(s) in SCP subsystems will manipulate and exchange data in a variety of manners (i.e., service(s) in the same SCP subsystem may perform the RAN processing and the firewall processing in the example above) while remaining within the scope of the present disclosure as well.

Figure 9:
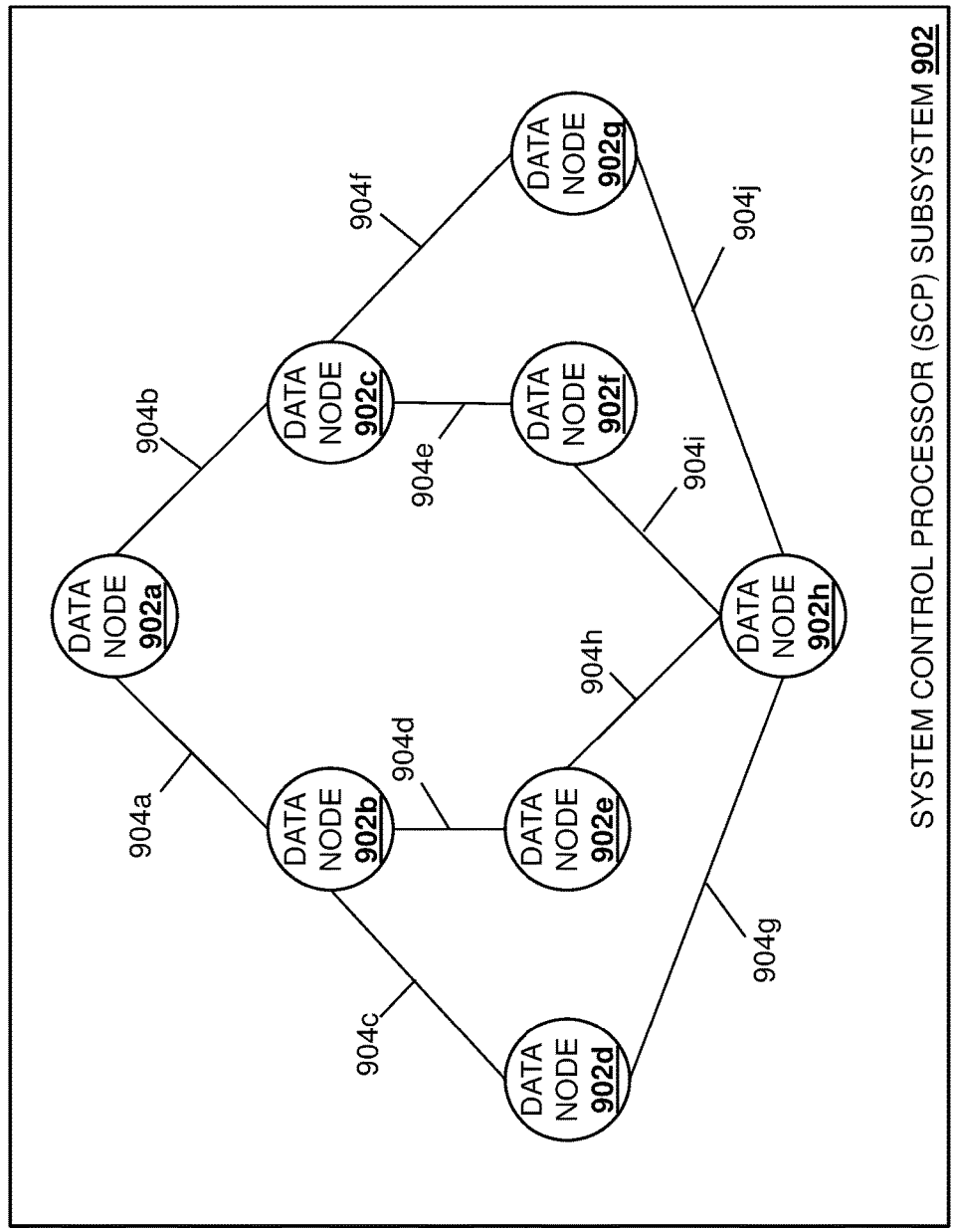
FIG. 9 is a schematic view illustrating an embodiment of an SCP local data flow control graph.
Figure 9:

With reference to FIG. 9, an embodiment of an SCP-local data flow control graph 900 is illustrated for an SCP subsystem 902 that may be any of the SCP subsystems 702a-702c in the edge location 702, the SCP subsystems 704a-704c in the core location 704, and/or the SCP subsystems 706a-706c in the cloud location 706. As illustrated, the SCP-local data flow control graph 900 illustrates how the SCP subsystem 902 includes a plurality of data nodes 902a, 902b, 902c, 902d, 902e, 902f, 902g, and 902h that provide the "vertices" of the SCP-local data flow control graph 900, and a plurality of manipulation/exchange operations 904a, 904b, 904c, 904d, 904e, 904f, 904g, 904h, 904i, and 904j that provide the "edges" of the SCP-local data flow control graph 900, and one of skill in the art in possession of the present disclosure will appreciate that the "edge" between any two "vertices" in the SCP-local data flow control graph 900 may define the manipulation/exchange operations that will be performed on any first data located at a first data node (e.g., a first data/work product) to produce second data that is located at a second data node (e.g., a second data/work product).

As such, the example in FIG. 9 defines how a data/work product at the data node 902a should have a manipulation/exchange operation 904a performed on it by a service in the SCP subsystem 902 to provide a data/work product at the data node 902b, how a data/work product at the data node 902a should also have a manipulation/exchange operation 904b performed on it by a service in the SCP subsystem 902 to provide a data/work product at the data node 902c, how a data/work product at the data node 902b should have a manipulation/exchange operation 904c performed on it by a service in the SCP subsystem 902 to provide a data/work product at the data node 902d, how a data/work product at the data node 902b should also have a manipulation/exchange operation 904d performed on it by a service in the SCP subsystem 902 to provide a data/work product at the data node 902e, how a data/work product at the data node 902c should have a manipulation/exchange operation 904e performed on it by a service in the SCP subsystem 902 to provide a data/work product at the data node 902f, how a data/work product at the data node 902c should also have a manipulation/exchange operation 904f performed on it by a service in the SCP subsystem 902 to provide a data/work product at the data node 902g, how a data/work product at the data node 902d should have a manipulation/exchange operation 904g performed on it by a service in the SCP subsystem 902 to provide a data/work product at the data node 902h, how a data/work product at the data node 902e should have a manipulation/exchange operation 904h performed on it by a service in the SCP subsystem 902 to provide a data/work product at the data node 902h, how a data/work product at the data node 902f should have a manipulation/exchange operation 904i performed on it by a service in the SCP subsystem 902 to provide a data/work product at the data node 902h, and how a data/work product at the data node 902g should have a manipulation/exchange operation 904j performed on it by a service in the SCP subsystem 902 to provide a data/work product at the data node 902h.

As such, the SCP-local data flow control graph 900 may define a data flow operation that will be performed by the SCP subsystem, with the data nodes 902a-902h and the manipulation/exchange operations 904a-904j defining how manipulation operations may be performed on data (e.g., received as a data/work product at the data node 902a), defining how that data should be exchange between different data/work products (e.g., based on security policies, Service Level Agreement (SLA) policies, etc.), and/or defining any other service operation on that data as the data is transformed from first data received by that SCP subsystem to second data that may be provided to a different SCP subsystem or a final data destination/application. However, while a specific example of an SCP-local data flow control graph has been illustrated and described that defines how one or more services manipulate and/or exchange data between each other in an SCP subsystem, one of skill in the art in possession of the present disclosure will appreciate that other graph data structures may be utilized to define how data is manipulated and exchanged between services in an SCP subsystem while remaining within the scope of the present disclosure as well.

The method 600 then proceeds to block 608 where the control plane system generates one or more inter-SCP data flow control graphs for one or more SCP subsystems. In an embodiment, at block 608, the graph-based data flow control engine 404 in the control plane system 206/400/700 may operate to generate inter-SCP data flow control graphs that define how one or more of the SCP subsystem 702a-702c in the edge location 702, one or more of the SCP subsystem 704a-704c in the core location 704, and one or more of the SCP subsystem 706a-706c in the cloud location 706 will utilize one or more of their service(s) identified at block 604 to manipulate and exchange data to perform the workload identified at block 602. For example, in response to identifying the workload at block 602, the graph-based data flow control engine 404 in the control plane system 206/400/700 may use the service(s) identified at block 604 in order to generate inter-SCP data flow control graphs for one or more of the SCP subsystems that includes a service that is needed to manipulate and/or exchange data in order to perform the workload, with each inter-SCP data flow control graph defining how service(s) in one of those SCP subsystems will manipulate and exchange data with service(s) in another of those SCP subsystems.

Continuing with the specific example discussed above, at block 608 the graph-based data flow control engine 404 in the control plane system 206/400/700 may first generate the global data flow control graph discussed that generally defines the services that will be needed to perform the workload (e.g., the RAN processing, firewall processing, load balancer processing, and analytics processing described in the example above), select the particular service(s) provided by the SCP subsystems that accomplish the services defined in the global data flow control graph, and then generate the inter-SCP data flow control graphs to define how those services with manipulate and exchange data between SCP subsystems to perform the workload (e.g., inter-SCP data flow control graph(s) that defines how service(s) in first SCP subsystem(s) will manipulate and exchange data with service(s) in second SCP subsystem(s) to accomplish the RAN processing, the firewall processing, the load balancer processing, and the analytics processing). However, while a specific example is provided, one of skill in the art in possession of the present disclosure will appreciate inter-SCP data flow control graphs may define how service(s) in SCP subsystems will manipulate and exchange data with service(s) in other SCP subsystems in a variety of manners while remaining within the scope of the present disclosure as well.

Figure 10:
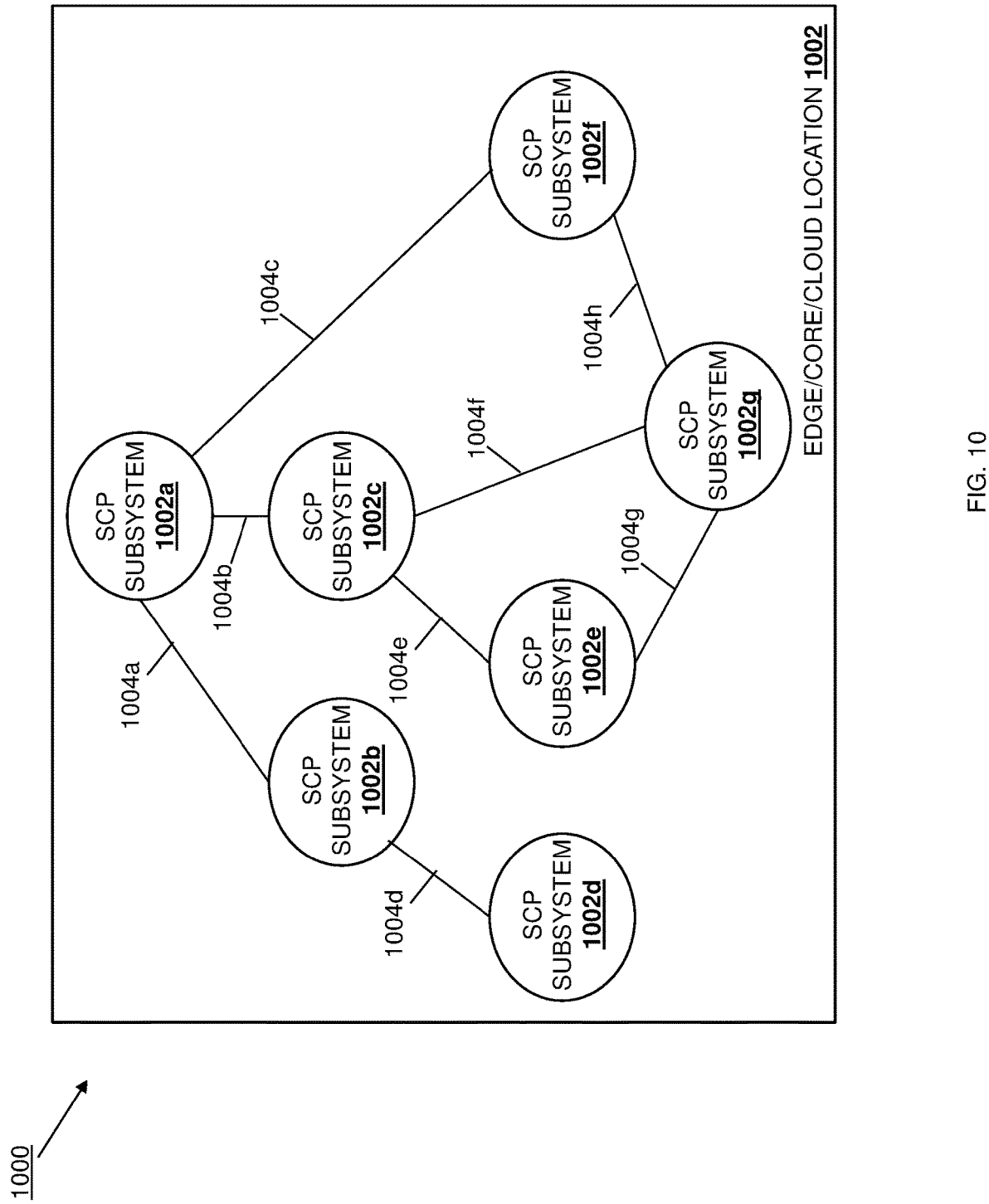
FIG. 10 is a schematic view illustrating an embodiment of an intra-location data flow control graph.

For example, with reference to FIG. 10, an embodiment of an intra-location data flow control graph 1000 is illustrated for an edge, cloud, or core location 1002 that may be any of the edge location 702, the core location 704, and/or the cloud location 706 discussed above with regard to FIG. 7. As illustrated, the intra-location data flow control graph 1000 illustrates how the edge, cloud, or core location 1002 includes a plurality of SCP subsystems 1002a, 1002b, 1002c, 1002d, 1002e, 1002f, and 1002g that provide the "vertices" of the intra-location data flow control graph 1000, and a plurality of manipulation/exchange operations 1004a, 1004b, 1004c, 1004d, 1004e, 1004f, 1004g, and 1004h that provide the "edges" of the intra-location data flow control graph 1000, and one of skill in the art in possession of the present disclosure will appreciate that the "edge" between any two "vertices" in the intra-location data flow control graph 1000 may define the manipulation/exchange operations that will be performed on any first data at a first data node (e.g., a first data/work product) in a first SCP subsystem provided in a location to produce second data at a second data node (e.g., a first data/work product) in a second SCP subsystem located at that location.

As such, the example in FIG. 10 defines how data at the SCP subsystem 1002a (e.g., a data/work product at a data node in that SCP subsystem) should have a manipulation/exchange operation 1004a performed on it by a service in the SCP subsystem 1002a to provide a data/work product at the SCP subsystem 1002b (e.g., at a data node in that SCP subsystem), how data at the SCP subsystem 1002a (e.g., a data/work product at a data node in that SCP subsystem) should also have a manipulation/exchange operation 1004b performed on it by a service in the SCP subsystem 1002a to provide a data/work product at the SCP subsystem 1002c (e.g., at a data node in that SCP subsystem), how data at the SCP subsystem 1002a (e.g., a data/work product at a data node in that SCP subsystem) should also have a manipulation/exchange operation 1004c performed on it by a service in the SCP subsystem 1002a to provide a data/work product at the SCP subsystem 1002f (e.g., at a data node in that SCP subsystem), how data at the SCP subsystem 1002b (e.g., a data/work product at a data node in that SCP subsystem) should have a manipulation/exchange operation 1004d performed on it by a service in the SCP subsystem 1002b to provide a data/work product at the SCP subsystem 1002d (e.g., at a data node in that SCP subsystem), how data at the SCP subsystem 1002c (e.g., a data/work product at a data node in that SCP subsystem) should have a manipulation/exchange operation 1004e performed on it by a service in the SCP subsystem 1002c to provide a data/work product at the SCP subsystem 1002e (e.g., at a data node in that SCP subsystem), how data at the SCP subsystem 1002c (e.g., a data/work product at a data node in that SCP subsystem) should also have a manipulation/exchange operation 1004f performed on it by a service in the SCP subsystem 1002c to provide a data/work product at the SCP subsystem 1002g (e.g., at a data node in that SCP subsystem), how data at the SCP subsystem 1002e (e.g., a data/work product at a data node in that SCP subsystem) should have a manipulation/exchange operation 1004g performed on it by a service in the SCP subsystem 1002e to provide a data/work product at the SCP subsystem 1002g (e.g., at a data node in that SCP subsystem), and how data at the SCP subsystem 1002f (e.g., a data/work product at a data node in that SCP subsystem) should have a manipulation/exchange operation 1004h performed on it by a service in the SCP subsystem 1002f to provide a data/work product it at the SCP subsystem 1002g (e.g., at a data node in that SCP subsystem).

As such, the intra-location data flow control graph 1000 may define a data flow operation that will be performed by any SCP subsystems, with the SCP subsystems 1002a-

1002g and the manipulation/exchange operations 1004a-1004g defining how manipulation operations may be performed on data (e.g., received as a data/work product at the SCP subsystem 1002a), defining how that data should be exchange between different data/work products at different SCP subsystems (e.g., based on security policies, Service Level Agreement (SLA) policies, etc.), and/or defining any other service operation on that data as the data is transformed from first data received by a first SCP subsystem at a location to second data that may be provided to a different SCP subsystem or a final data destination/application at that location. However, while a specific example of an intra-network data flow control graph has been illustrated and described that defines how one or more services manipulate and/or exchange data between SCP subsystems in the same location, one of skill in the art in possession of the present disclosure will appreciate that other graph data structures may be utilized to define how data is manipulated and exchanged between SCP subsystems in the same location while remaining within the scope of the present disclosure as well.

Figure 11:
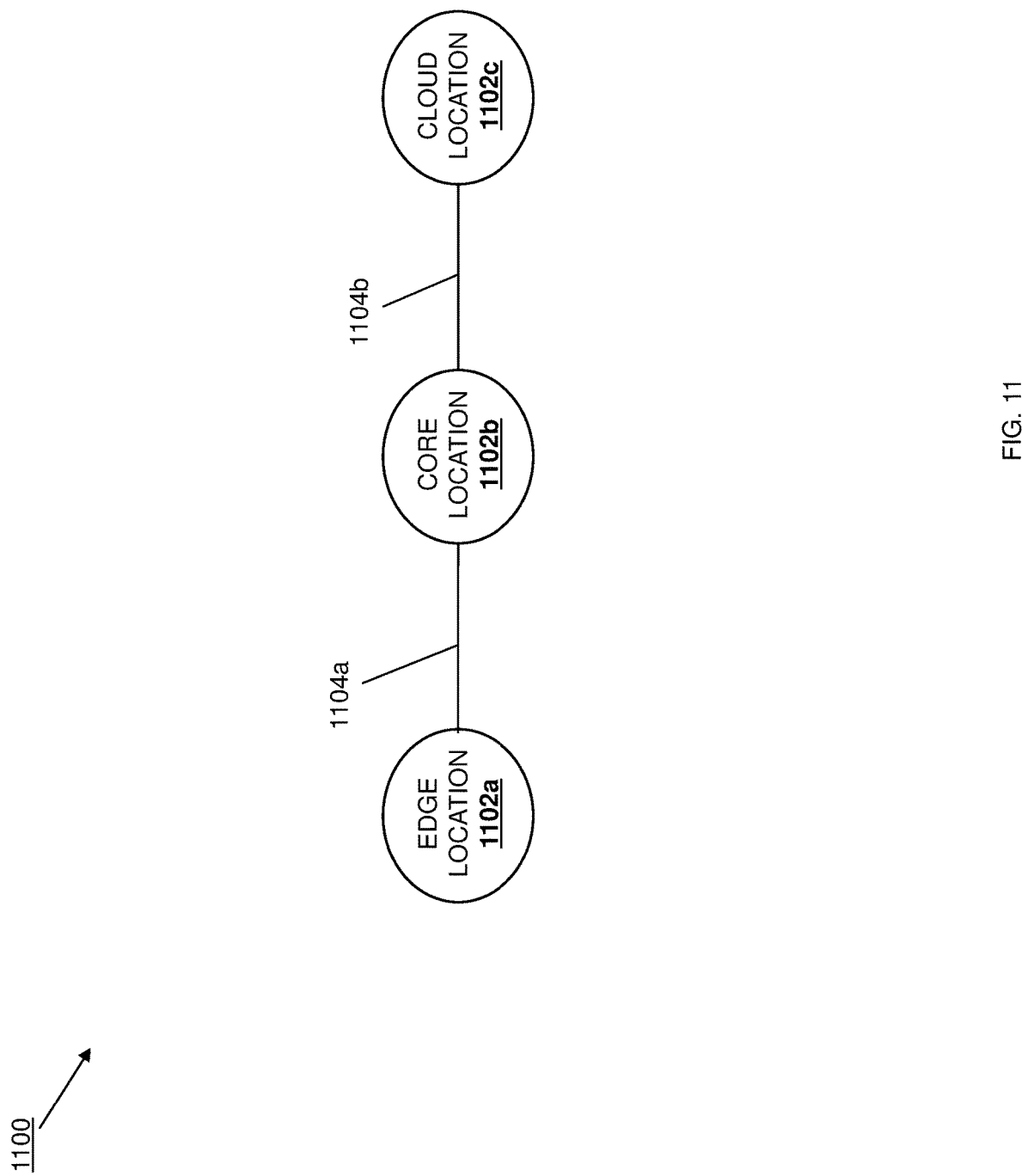
FIG. 11 is a schematic view illustrating an embodiment of an inter-location data flow control graph.

In another example, with reference to FIG. 11, an embodiment of an inter-location data flow control graph 1100 is illustrated for an edge location 1102a, a core location 1102b, and a cloud location 1102c that may be the edge location 702, the core location 704, and the cloud location 706 discussed above with reference to FIG. 7. As illustrated, the inter-location data flow control graph 1100 illustrates how the edge location 1102a, the core location 1102b, and the cloud location 1102c provide the "vertices" of the inter-location data flow control graph 1100, and a plurality of manipulation/exchange operations 1104a and 1104b that provide the "edges" of the inter-location data flow control graph 1100, and one of skill in the art in possession of the present disclosure will appreciate that the "edge" between any two "vertices" in the inter-location data flow control graph 1100 may define the manipulation/exchange operations that will be performed on any first data located at a first data node (e.g., a first data/work product) in an SCP subsystem located at a first location to produce second data that is located at a second data node (e.g., a second data/work product) in an SCP subsystem located at a second location.

As such, the example in FIG. 11 defines how data at the edge location 1102a (e.g., a data/work product at a data node in an SCP subsystem located at the edge location 1102a) should have a manipulation/exchange operation 1104a performed on it by a service in the SCP subsystem at the edge location 1102a to provide a data/work product at the core location 1102b (e.g., at a data node in an SCP subsystem located at the core location 1102b), and how data at the core location 1102b (e.g., a data/work product at a data node in an SCP subsystem located at the core location 1102b) should have a manipulation/exchange operation 1104b performed on it by a service in the SCP subsystem at the core location 1102b to provide a data/work product at the cloud location 1102c (e.g., at a data node in an SCP subsystem located at the cloud location 1102c).

As such, the inter-location data flow control graph 1100 may define a data flow operation that will be performed by any SCP subsystems in different locations, with the SCP subsystems in the edge location 1102a, core location 1102b, and cloud location 1102c and the manipulation/exchange operations 1104a and 1104b defining how manipulation operations may be performed on data (e.g., received as a data/work product at an SCP subsystem in the edge location), defining how that data should be exchange between different data/work products at different SCP subsystems in different locations(e.g., based on security policies, Service Level Agreement (SLA) policies, etc.), and/or defining any other service operation on that data as the data is transformed from first data received by a first SCP subsystem in a first location to second data that may be provided to a different SCP subsystem or a final data destination/application at a second location. However, while a specific example of an inter-network data flow control graph has been illustrated and described that defines how one or more services manipulate and/or exchange data between SCP subsystems in different locations, one of skill in the art in possession of the present disclosure will appreciate that other graph data structures may be utilized to define how data is manipulated and exchanged between SCP subsystems in different locations while remaining within the scope of the present disclosure as well.

Figure 12:
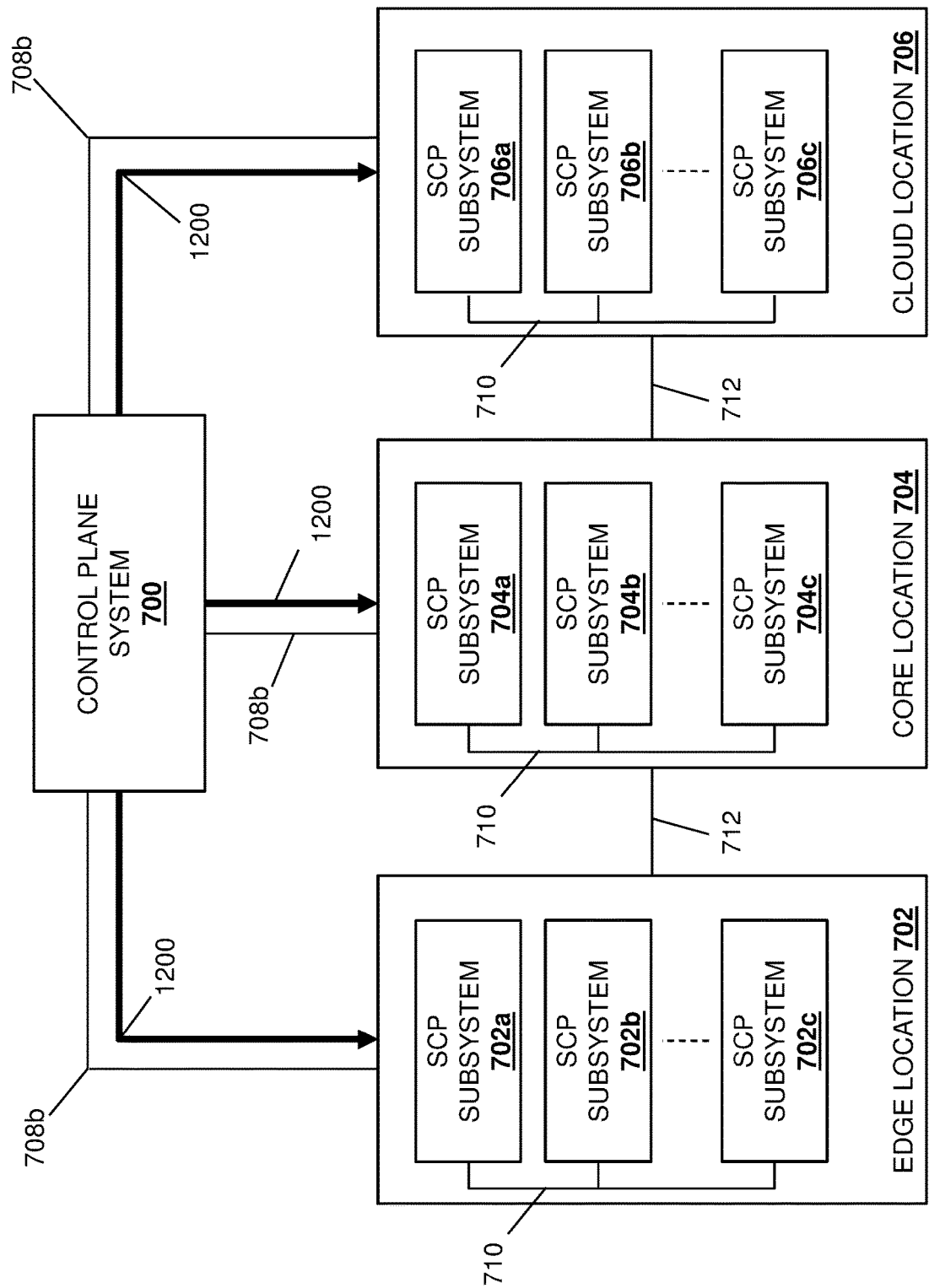
FIG. 12 is a schematic view illustrating an embodiment of the control plane system of and the SCP subsystems of FIG. 7 operating during the method of FIG. 5.

The method 600 then proceeds to block 610 where the control plane system transmits the respective SCP-local data flow control graphs and the one or more inter-SCP data flow control graphs to the plurality of SCP subsystems. With reference to FIG. 12, in an embodiment of block 610, the graph-based data flow control engine 404 in the control plane system 206/400/700 may perform data flow control graph transmission operations 1200 that include transmitting, via its communication system 408 and the graph orchestration channel 708a provided with each SCP subsystem 702a-702c in the edge location 702, each SCP subsystem 704a-704c in the core location 704, each SCP subsystem 706a-706c in the cloud location 706, one or more of the data flow control graphs generated at blocks 606 and 608. For example, at block 610, the graph-based data flow control engine 404 in the control plane system 206/400/700 may transmit the SCP-local data flow control graphs generated at block 606 to each SCP subsystem that includes a service that will operate to manipulate/exchange data between data nodes in that SCP subsystem in order to perform the workload identified at block 602.

Furthermore, at block 610, the graph-based data flow control engine 404 in the control plane system 206/400/700 may transmit the intra-location data flow control graphs generated at block 608 to each SCP subsystem that includes a service that will operate to manipulate/exchange data between a data node in that SCP subsystem and a data node in another SCP subsystem that is included in the same location in order to perform the workload identified at block 602. Further still, at block 610, the graph-based data flow control engine 404 in the control plane system 206/400/700 may transmit the inter-location data flow control graphs generated at block 608 to each SCP subsystem that includes a service that will operate to manipulate/exchange data between a data node in that SCP subsystem and a data node in another SCP subsystem that is included in a different location in order to perform the workload identified at block 602.

Figure 13:
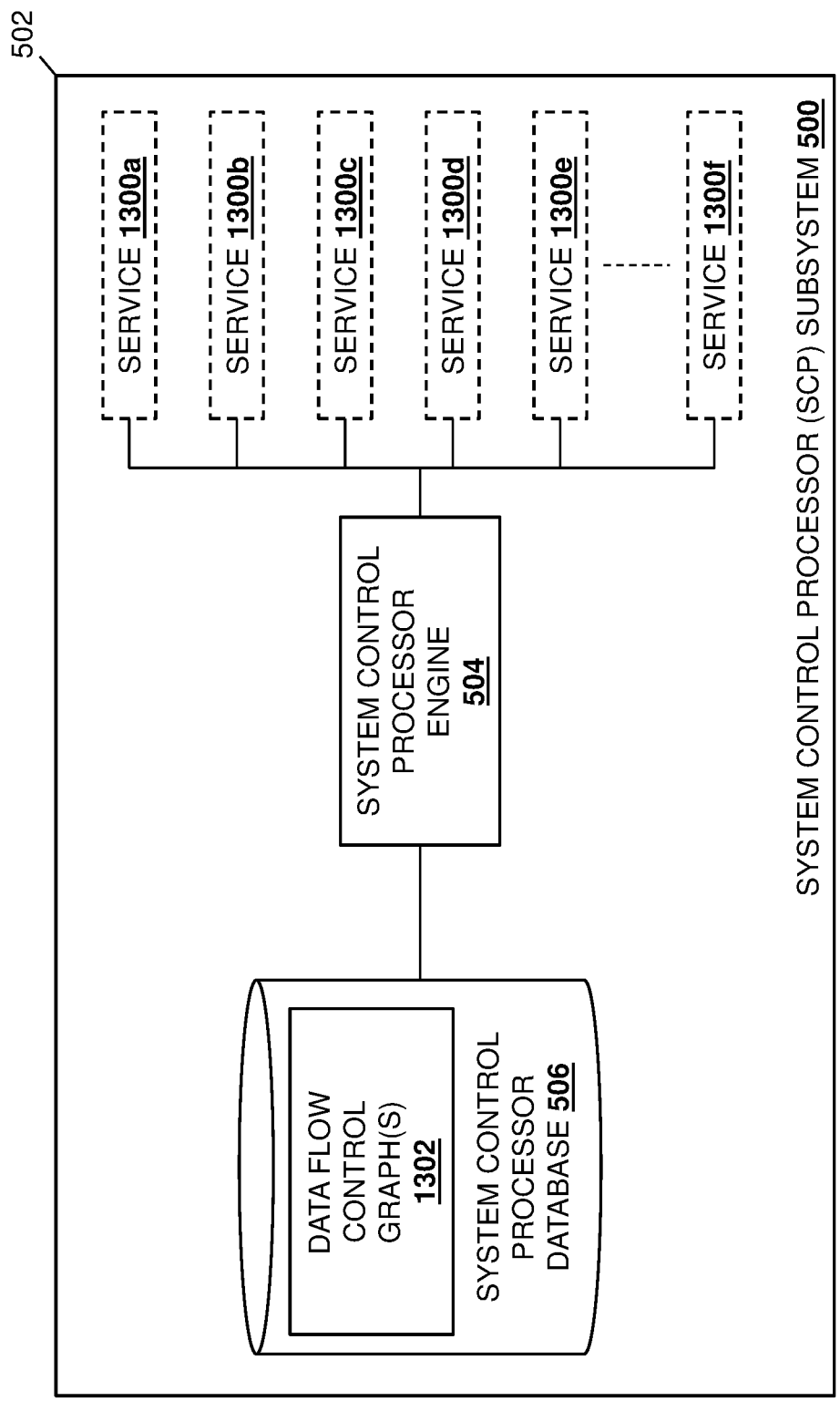
FIG. 13 is a schematic view illustrating an embodiment of the SCP subsystem of FIG. 5 operating during the method of FIG. 6.

As such, following block 610, each of the SCP subsystems that will manipulate and/or exchange data to perform the workload identified at block 602 may store one or more of the data flow control graphs generated at blocks 606 and 608. For example, FIG. 13 illustrates the SCP subsystem 500 including the SCP engine 504 that is configured to provide services 1300a, 1300b, 1300c, 1300d, 1300e, and up to 1300f, and that stored one or more data flow control graph(s) 1302 that define how the service(s) 1300a-1300f should operate to manipulate and exchange data between data nodes in that SCP subsystem 500, with a data node in another SCP subsystem in the same location, and/or with a data node in another SCP subsystem in a different location. Thus, following block 610, one or more SCP subsystems 702a-702c in the edge location 702, one or more SCP subsystems 704a-704c in the core location 704, and/or one or more SCP subsystems 706a-706c in the cloud location 706 may be configured to utilize their data flow control graphs to cause their service(s) to manipulate and/or exchange data in order to perform the workload identified at block 602.

The method 600 then proceeds to block 612 where the SCP subsystems use the SCP-local data flow control graphs and the one or more inter-SCP data flow control graphs to cause their one or more services to manipulate and exchange data to perform the workload. In an embodiment, at block 612, the SCP engine 504 in any of the SCP subsystems 702a-702c/500 in the edge location 702, any of the SCP subsystems 704a-704c/500 in the core location 704, and/or any of the SCP subsystems 706a-706c/500 in the cloud location 706, may utilize their service(s) 1300a-1300f to manipulate and exchange data between data nodes in their SCP subsystem, manipulate and exchange data between a data node in their SCP subsystem and a data node in another SCP subsystem in the same location, and manipulate and exchange data between a data node in their SCP subsystem and a data node in another SCP subsystem in a different location, in order to transform initial data that is received by an SCP subsystem located at the edge location 702 to produce final data located at the cloud location 706.

Figure 14:
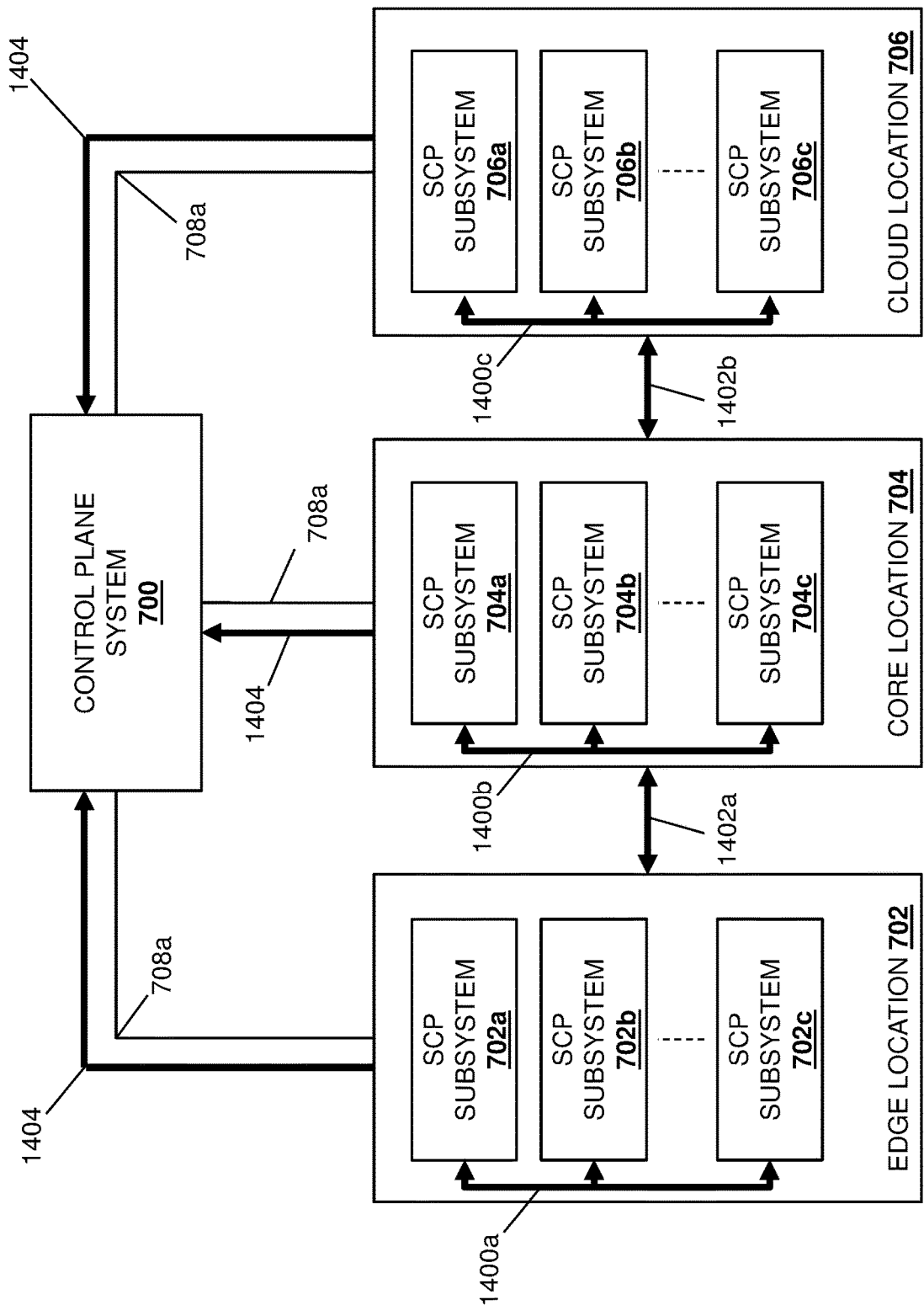
FIG. 14 is a schematic view illustrating an embodiment of the control plane system of and the SCP subsystems of FIG. 7 operating during the method of FIG. 5.

As such, any of the SCP subsystems 702a-702c, 704a-704c, and/or 706a-706c may utilize their respective SCP local data flow control graphs to manipulate and exchange data between data nodes using their services. Furthermore, as illustrated in FIG. 14, any of the SCP subsystems 702a-702c/500 in the edge location 702 may perform data manipulation/exchange operations 1400a using an intra-location data flow control graph to manipulate and/or exchange data with each other, any of the SCP subsystems 704a-704c/500 in the core location 704 may perform data manipulation/exchange operations 1400b using an intra-location data flow control graph to manipulate and/or exchange data with each other, and/or any of the SCP subsystems 706a-706c/500 in the cloud location 706 may perform data manipulation/exchange operations 1400a using an intra-location data flow control graph to manipulate and/or exchange data with each other. Similarly, any of the SCP subsystems 702a-702c/500 in the edge location 702 may perform data manipulation/exchange operations 1402a using an inter-location data flow control graph to manipulate and/or exchange data any of the SCP subsystems 704a-704c/500 in the core location 704, and any of the SCP subsystems 704a-704c/500 in the core location 704 may perform data manipulation/exchange operations 1402b using an inter-location data flow control graph to manipulate and/or exchange data any of the SCP subsystems 706a-706c/500 in the cloud location 706. Further still, FIG. 14 also illustrates how any of the SCP subsystems 702a-702c/500 in the edge location 702, any of the SCP subsystems 704a-704c/500 in the core location 704, and/or any of the SCP subsystems 706a-706c/500 in the cloud location 706 may utilize their respective telemetry/failure recovery channel 708b with the control plane system 700 in order to perform telemetry reporting operations 1404 and report telemetry data associated with the performance of the workload identified at block 602.

As such, one of skill in the art in possession of the present disclosure will appreciate how the data flow control graphs operate to coordinate the use of multiple services (e.g., trusted applications) provided in an SCP subsystem and across multiple SCP subsystems in order to manipulate and exchange data between those SCP subsystems in a manner that provides a controlled data flow that performs a desired workload. As such, the control plane system 206/700 may make a variety of decisions about which service in which SCP subsystem will perform any workload requirement or operation to provide the workload. For example, if the workload requires associated data to be compressed, the control plane system 206/700 may decide whether the associated compression operation should happen at an edge location, a core location, or a cloud location, and then generate data flow control graphs that define the performance of that compression operation at the determined location. Furthermore, the control plane system 206/700 may make determinations about whether or when data should be modified by a service in any SCP subsystem performing the workload, how data should be transmitted from one data node to another (e.g., by defining the data transmission technology, the data transmission speed, etc.), whether or when new data should be added to existing data, and/or a variety of other manipulation/exchange operations that would be apparent to one of skill in the art in possession of the present disclosure, and enable those manipulation/exchange operations via the data flow control graphs discussed above.

One of skill in the art in possession of the present disclosure will recognize that conventional data flow control systems such as, for example, Software Defined Networking (SDN) systems, simply operate to provide a "roadmap" that provide directions for forwarding data received at a first data location to a second data location, which may be analogized to providing a friend with a map that has directions to a dinner party and that allows that friend to drive their car to that dinner party. To contrast with the data flow control graphs of the present disclosure via the use of the analogy above, the simple roadmap discussed above is enhanced to include not only directions to the dinner party that allow a friend to drive their car to that dinner party, but also instructions about what kind of car to drive, how fast to drive that car, locations to stop along the way and pick up items for the dinner party, etc.

The method 600 then proceeds to decision block 614 where it is determined whether an SCP subsystem has become unavailable. In an embodiment, at decision block 614, the graph-based data flow control engine 404 in the control plane system 206/400/700 may monitor for the unavailability (e.g., failure) of any SCP subsystem and/or service that operates to perform any portion of the workload at block 612. For example, the telemetry data associated with the performance of the workload and reported during the telemetry reporting operations 1404 by any of the SCP subsystems 702a-702c/500 in the edge location 702, any of the SCP subsystems 704a-704c/500 in the core location 704, and/or any of the SCP subsystems 706a-706c/500 in the cloud location 706 (and/or any other data or communications between those SCP subsystems and the control plane system) may be received and analyzed by the graph-based data flow control engine 404 in the control plane system 206/400/700 to determine whether an SCP subsystem (or its service that is being utilized to perform the workload) is no longer available. If at decision block 614, it is determined that an SCP subsystem has not become unavailable, the method 600 returns to block 612. As such, the method 600 may loop such that SCP subsystems use one or more data flow control graphs to cause their services to manipulate and/or exchange data in order to perform the workload identified at block 602.

If at decision block 614, it is determined that an SCP subsystem has become unavailable, the method 600 proceeds to block 616 where the control plane system generates replacement SCP-local data flow control graph(s) for one or more of the plurality of SCP subsystems. In an embodiment, at block 616 and in response to determining that an SCP subsystem (or its service that is being used to perform the workload) is unavailable, the graph-based data flow control engine 404 in the control plane system 206/400/700 may generate replacement SCP-local data flow control graph(s) for any SCP subsystems that are performing the workload and that are effected by the unavailable SCP subsystem/service in substantially the same manner as described above with reference to block 606. As such, an unavailable service in an SCP subsystem may result in the generation of a replacement SCP-local data flow control graph that identifies a manipulation/exchange operation performed by an available service in that SCP subsystem that replaces the manipulation/exchange operation that was being performed by unavailable service in that SCP subsystem, as well as any other modifications to manipulation/exchange operations performed other services in that SCP subsystem that were affected by the unavailable service so that the workload may be performed by services in that SCP subsystem.

The method 600 may then proceed to optional block 618 where the control plane system generates replacement inter-SCP data flow control graph(s) for one or more of the plurality of SCP subsystems. In an embodiment, at optional block 618 and in response to determining that an SCP subsystem (or its service that is being used to perform the workload) is unavailable, the graph-based data flow control engine 404 in the control plane system 206/400/700 may generate replacement intra-location and/or inter-location data flow control graph(s) for any SCP subsystems that are performing the workload and that are effected by the unavailable SCP subsystem/service in substantially the same manner as described above with reference to block 608. As such, an unavailable service in an SCP subsystem may result in the generation of a replacement intra-location data flow control graph and/or a replacement inter-location data flow control graph that identifies a manipulation/exchange operation performed by an available service in that SCP subsystem that replaces the manipulation/exchange operation that was being performed by unavailable service in that SCP subsystem, as well as any other modifications to manipulation/exchange operations performed other services in that SCP subsystem or other SCP subsystems (in the same or different locations) that were affected by the unavailable service so that the workload may be performed by those services in those SCP subsystems The method 600 then proceeds to block 620 where the control plane system transmits the replacement SCP-local data flow control graphs and, in some embodiments, one or more replacement inter-SCP data flow control graphs, to the one or more SCP subsystems. In an embodiment, at block 620, the graph-based data flow control engine 404 in the control plane system 206/400/700 may transmit the replacement SCP-local data flow control graphs and, in some embodiments, one or more replacement inter-SCP data flow control graphs, to the SCP subsystems for which they were generated at blocks 616 and 618 in substantially the same manner as described above with reference to block 610.

The method 600 may then return to block 612. As such, any time an SCP subsystem or one or more of its services that perform a workload become unavailable, the method 600 may operate to generate replacement data flow control graphs to ensure that unavailable services or SCP subsystems (and services or SCP subsystems affected by that unavailability) are replaced by available services or SCP subsystems so that the performance of the workload is not interrupted (or may be resumed after an interruption). Furthermore, the telemetry data associated with the performance of the workload and reported during the telemetry reporting operations 1404 by any of the SCP subsystems 702a-702c/500 in the edge location 702, any of the SCP subsystems 704a-704c/500 in the core location 704, and/or any of the SCP subsystems 706a-706c/500 in the cloud location 706 (and/or any other data or communications between those SCP subsystems and the control plane system), may be received and analyzed by the graph-based data flow control engine 404 in the control plane system 206/400/700 to optimize workloads and/or the networked system 200 by, for example, suggesting that additional SCP subsystem(s) be added to the networked system 200, suggesting that service(s) (e.g., security services, other data flow services, etc.) be added to SCP subsystems, and/or providing other optimization suggestions that would be apparent to one of skill in the art in possession of the present disclosure.

Thus, systems and methods have been described that provide for the control of data flow within and between SCP subsystems using data flow control graphs that provide for the manipulation and exchange of data by the SCP subsystems in a manner required by a workload. For example, the graph-based data flow control system of the present disclosure may include a control plane system coupled to SCP subsystems. The control plane system identifies a workload, and identifies service(s) on the SCP subsystems for manipulating/exchanging data to perform the workload. The control plane system generates a respective SCP-local data flow control graph for each SCP subsystem that defines how their service(s) will manipulate/exchange data within that SCP subsystem, and generates inter-SCP data flow control graph(s) that define how service(s) provided by at least one SCP subsystem will manipulate/exchange data with service(s) provided by at least one other SCP subsystem. The control plane system then transmits each respective SCP-local data flow control graph to each of the SCP subsystems, and the inter-SCP data flow control graph(s) to at least one SCP subsystem, and the SCP subsystems use those data flow control graphs to cause their service(s) to manipulate/exchange data to perform the workload. As such, multiple services provided by (or across) different SCP subsystems may be coordinated to manipulate and exchange data that may be received from an initial data source/application in order to transform that initial data into final data that may be provided to a final data destination/application as defined by a workload.

As will be appreciated by one of skill in the art in possession of the present disclosure, the graph-based data flow control system of the present disclosure may operate to simplify application development by transitioning application development from conventional monolithic applications to a control plane architecture that does not require data to flow through the controlling application, provide relatively higher levels of security due to the flow of data through trusted SCP subsystems and the separation of the data plane from data flow control decision making code, create an overall data management workload using a collection of local graphs for each SCP subsystem along with a global graph for overall SCP subsystem orchestration, provide for dynamic reconfiguration of graphs to optimize data flow, provide an analytics plane that may operate to suggest optimizations for the hardware and/or data flow, and/or provide a variety of other benefits that would be apparent to one of skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A graph-based data flow control system, comprising:
a plurality of data processing subsystems; and
a control system that is coupled to each of the plurality of data processing subsystems, wherein the control system is configured to:
identify a workload;
identify the plurality of data processing subsystems that are configured to manipulate and exchange data to perform the workload;
generate a respective local-data-processing-subsystem data flow control graph for each of the plurality of data processing subsystems, where each respective local-data-processing-subsystem data flow control graph defines how that data processing subsystem will manipulate and exchange data within that data processing subsystem to perform the workload;
generate at least one inter-data-processing-subsystem data flow control graph that defines how at least one first data processing subsystem included in the plurality of data processing subsystems will manipulate and exchange data with at least one second data processing subsystem included in the plurality of data processing subsystems to perform the workload; and
transmit each respective local-data-processing-subsystem data flow control graph to each of the plurality of data processing subsystems, and the at least one inter-data-processing-subsystem data flow control graph to at least one of the plurality of data processing subsystems, wherein the plurality of data processing subsystems are configured to utilize the respective local-data-processing-subsystem data flow control graph and the at least one inter-data-processing-subsystem data flow control graph to manipulate and exchange data to perform the workload.

2. The system of claim 1, wherein the plurality of data processing subsystems include:
a first subset of the plurality of data processing subsystems that are provided in a first location;
a second subset of the plurality of data processing subsystems that are provided in a second location; and
a third subset of the plurality of data processing subsystems that are provided in a third location,
and wherein the at least one inter-data-processing-subsystem data flow control graph includes:
an intra-location data flow control graph that defines how the at least one first data processing subsystem provided in one of the first, second, or third locations will manipulate and exchange data with the at least one second data processing subsystem provided in that first, second, or third locations to perform the workload; and
an inter-location data flow control graph that defines how the at least one first data processing subsystem provided in one of the first, second, or third locations will manipulate and exchange data with the at least one second data processing subsystem provided in another of the first, second, or third locations to perform the workload.

3. The system of claim 1, wherein the control system is provided by a subset of the plurality of data processing subsystems.

4. The system of claim 1, wherein the control system is configured to:
determine that one of the plurality of data processing subsystems has become unavailable and, in response, identify a replacement data processing subsystem; and
generate at least one replacement inter-data-processing-subsystem data flow control graph that defines how the replacement data processing subsystem will manipulate and exchange data with at least one of the plurality of data processing subsystems to perform the workload.

5. The system of claim 1, wherein the control system is configured to:
collect telemetry data from one or more of the plurality of data processing subsystems in response to their manipulating and exchanging data to perform the workload.

6. The system of claim 5, wherein the control system is configured to:
transmit the local-data-processing-subsystem data flow control graphs and the at least one inter-data-processing-subsystem data flow control graph via secure graph orchestration communication channels; and
receive the telemetry data via secure telemetry communication channels that are separate from the secure graph orchestration channels.

7. An Information Handling System (IHS), comprising:
a processing subsystem; and
a memory subsystem that is coupled to the processing subsystem and that includes instructions that, when executed by the processing subsystem, cause the processing subsystem to provide a graph-based data flow control engine that is configured to:
identify a workload;
identify a plurality of data processing subsystems that are configured to manipulate and exchange data to perform the workload;
generate a respective local-data-processing-subsystem data flow control graph for each of the plurality of data processing subsystems, where each respective local-data-processing-subsystem data flow control graph defines how that data processing subsystem will manipulate and exchange data within that data processing subsystem to perform the workload;
generate at least one inter-data-processing-subsystem data flow control graph that defines how at least one first data processing subsystem included in the plurality of data processing subsystems will manipulate and exchange data with at least one second data processing subsystem included in the plurality of data processing subsystems to perform the workload; and
transmit each respective local-data-processing-subsystem data flow control graph to each of the plurality of data processing subsystems, and the at least one inter-data-processing-subsystem data flow control graph to at least one of the plurality of data processing subsystems, wherein the plurality of data processing subsystems are configured to utilize the respective local-data-processing-subsystem data flow control graph and the at least one inter-dataprocessing-subsystem data flow control graph to cause manipulate and exchange data to perform the workload.

8. The IHS of claim 7, wherein the plurality of data processing subsystems include:
a first subset of the plurality of data processing subsystems that are provided in a first location;
a second subset of the plurality of data processing subsystems that are provided in a second location; and
a third subset of the plurality of data processing subsystems that are provided in a third location,
and wherein the at least one inter-data-processing-subsystem data flow control graph includes:
an intra-location data flow control graph that defines how the at least one first data processing subsystem provided in one of the first, second, or third locations will manipulate and exchange data with the at least one second data processing subsystem provided in that first, second, or third locations to perform the workload; and
an inter-location data flow control graph that defines how the at least one first data processing subsystem provided in one of the first, second, or third locations will manipulate and exchange data with the at least one second data processing subsystem provided in another of the first, second, or third locations to perform the workload.

9. The IHS of claim 7, wherein the IHS is provided by a subset of the plurality of data processing subsystems.

10. The IHS of claim 7, wherein the graph-based data flow control engine is configured to:
determine that one of the plurality of data processing subsystems has become unavailable and, in response, identify a replacement data processing subsystem; and
generate at least one replacement inter-data-processing-subsystem data flow control graph that defines how the replacement data processing subsystem will manipulate and exchange data with at least one of the plurality of data processing subsystems to perform the workload.

11. The IHS of claim 7, wherein the graph-based data flow control engine is configured to:
collect telemetry data from one or more of the plurality of data processing subsystems in response to their manipulating and exchanging data to perform the workload.

12. The IHS of claim 11, wherein the graph-based data flow control engine is configured to:
transmit the local-data-processing-subsystem data flow control graphs and the at least one inter-data-processing-subsystem data flow control graph via secure graph orchestration communication channels; and
receive the telemetry data via secure telemetry communication channels that are separate from the secure graph orchestration channels.

13. The IHS of claim 7, wherein each of the plurality of data processing subsystems provide at least one trusted application.

14. A method for providing graph-based data flow control, comprising:
identifying, by a control system, a workload;
identifying, by the control system, a plurality of data processing subsystems that are configured to manipulate and exchange data to perform the workload;
generating, by the control system, a respective local-data-processing-subsystem data flow control graph for each of the plurality of data processing subsystems, where each respective local-data-processing-subsystem data flow control graph defines how that data processing subsystem will manipulate and exchange data within that data processing subsystem to perform the workload;
generating, by the control system, at least one inter-data-processing-subsystem data flow control graph that defines how at least one first data processing subsystem included in the plurality of data processing subsystems will manipulate and exchange data with at least one second data processing subsystem included in the plurality of data processing subsystems to perform the workload; and
transmitting, by the control system, each respective local-data-processing-subsystem data flow control graph to each of the plurality of data processing subsystems, and the at least one inter-data-processing-subsystem data flow control graph to at least one of the plurality of data processing subsystems, wherein the plurality of data processing subsystems are configured to utilize the respective local-data-processing-subsystem data flow control graph and the at least one inter-data-processing-subsystem data flow control graph to manipulate and exchange data to perform the workload.

15. The method of claim 14, wherein the plurality of data processing subsystems include:
a first subset of the plurality of data processing subsystems that are provided in a first location;
a second subset of the plurality of data processing subsystems that are provided in a second location; and
a third subset of the plurality of data processing subsystems that are provided in a third location,
and wherein the at least one inter-data-processing-subsystem data flow control graph includes:
an intra-location data flow control graph that defines how the at least one first data processing subsystem provided in one of the first, second, or third locations will manipulate and exchange data with the at least one second data processing subsystem provided in that first, second, or third locations to perform the workload; and
an inter-location data flow control graph that defines how the at least one first data processing subsystem provided in one of the first, second, or third locations will manipulate and exchange data with the at least one second data processing subsystem provided in another of the first, second, or third locations to perform the workload.

16. The method of claim 14, wherein the control system is provided by a subset of the plurality of data processing subsystems.

17. The method of claim 14, further comprising:
determining, by the control system, that one of the plurality of data processing subsystems has become unavailable and, in response, identifying a replacement data processing subsystem; and
generating, by the control system, at least one replacement inter-data-processing-subsystem data flow control graph that defines how the replacement data processing subsystem will manipulate and exchange data with at least some of the plurality of data processing subsystems to perform the workload.

18. The method of claim 14, further comprising:
collecting, by the control system, telemetry data from one or more of the plurality of data processing subsystems in response to their manipulating and exchanging data to perform the workload.

19. The method of claim 14, further comprising:
transmitting, by the control system, the local-data-processing-subsystem data flow control graphs and the at least one inter-data-processing-subsystem data flow control graph via secure graph orchestration communication channels; and
receiving, by the control system, the telemetry data via secure telemetry communication channels that are separate from the secure graph orchestration communication channels.

20. The method of claim 14, wherein each of the plurality of data processing subsystems provide at least one trusted application.

\* \* \* \* \*